United States Patent
Ahn et al.

(10) Patent No.: US 11,956,338 B2
(45) Date of Patent: *Apr. 9, 2024

(54) CORRELATING PACKETS IN COMMUNICATIONS NETWORKS

(71) Applicant: Centripetal Networks, LLC, Portsmouth, NH (US)

(72) Inventors: David K. Ahn, Winston-Salem, NC (US); Peter P. Geremia, Portsmouth, NH (US); Pierre Mallett, III, Herndon, VA (US); Sean Moore, Hollis, NH (US); Robert T. Perry, Ashburn, VA (US)

(73) Assignee: Centripetal Networks, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,490

(22) Filed: May 19, 2023

(65) Prior Publication Data

US 2023/0291817 A1 Sep. 14, 2023

Related U.S. Application Data

(63) Continuation of application No. 17/177,572, filed on Feb. 17, 2021, now Pat. No. 11,683,401, which is a
(Continued)

(51) Int. Cl.
*H04L 29/06* (2006.01)
*H04L 9/40* (2022.01)
(Continued)

(52) U.S. Cl.
CPC ............ *H04L 69/22* (2013.01); *H04L 43/026* (2013.01); *H04L 43/04* (2013.01); *H04L 43/12* (2013.01);
(Continued)

(58) Field of Classification Search
CPC ....... H04L 69/22; H04L 43/026; H04L 43/04; H04L 43/12; H04L 45/745;
(Continued)

(56) References Cited

U.S. PATENT DOCUMENTS 5,303,303 A 4/1994 White
5,835,726 A 11/1998 Shwed et al.
(Continued)

FOREIGN PATENT DOCUMENTS

AU 2005328336 B2 9/2011
AU 2006230171 B2 6/2012
(Continued)

OTHER PUBLICATIONS

Appendix E, as cited in Complaint of Centripetal Networks, Inc. dated Apr. 19, 2022, Certified Copy of Prosecution History for U.S. Pat. No. 10,284,526 (20 parts), 9,093 pages.
(Continued)

*Primary Examiner* — Obaidul Huq
(74) *Attorney, Agent, or Firm* — Banner & Witcoff, Ltd.

(57) ABSTRACT

A computing system may identify packets received by a network device from a host located in a first network and may generate log entries corresponding to the packets received by the network device. The computing system may identify packets transmitted by the network device to a host located in a second network and may generate log entries corresponding to the packets transmitted by the network device. Utilizing the log entries corresponding to the packets received by the network device and the log entries corresponding to the packets transmitted by the network device, the computing system may correlate the packets transmitted by the network device with the packets received by the network device.

30 Claims, 7 Drawing Sheets

Related U.S. Application Data continuation of application No. 16/854,094, filed on Apr. 21, 2020, now Pat. No. 10,931,797, which is a continuation of application No. 16/554,293, filed on Aug. 28, 2019, now Pat. No. 10,659,573, which is a continuation of application No. 15/413,947, filed on Jan. 24, 2017, now Pat. No. 10,530,903, which is a continuation of application No. 14/714,207, filed on May 15, 2015, now Pat. No. 9,560,176, which is a continuation of application No. 14/618,967, filed on Feb. 10, 2015, now Pat. No. 9,264,370.

(51) Int. Cl.
  *H04L 43/026* (2022.01)
  *H04L 43/04* (2022.01)
  *H04L 43/12* (2022.01)
  *H04L 45/745* (2022.01)
  *H04L 47/2483* (2022.01)
  *H04L 47/32* (2022.01)
  *H04L 61/2567* (2022.01)
  *H04L 69/22* (2022.01)
  *H04L 43/087* (2022.01)
  *H04L 43/106* (2022.01)
  *H04L 43/16* (2022.01)

(52) U.S. Cl.
  CPC ........ *H04L 45/745* (2013.01); *H04L 47/2483* (2013.01); *H04L 47/32* (2013.01); *H04L 61/2567* (2013.01); *H04L 63/0263* (2013.01); *H04L 43/087* (2013.01); *H04L 43/106* (2013.01); *H04L 43/16* (2013.01)

(58) Field of Classification Search
  CPC . H04L 47/2483; H04L 47/32; H04L 61/2567; H04L 63/0263; H04L 43/087; H04L 43/106; H04L 43/16
  USPC ........................................................ 370/241
  See application file for complete search history.

(56) References Cited

U.S. PATENT DOCUMENTS

| | | | |
|---|---|---|---|
| 6,098,172 A | 8/2000 | Coss et al. |
| 6,147,976 A | 11/2000 | Shand et al. |
| 6,226,372 B1 | 5/2001 | Beebe et al. |
| 6,279,113 B1 | 8/2001 | Vaidya |
| 6,317,837 B1 | 11/2001 | Kenworthy |
| 6,484,261 B1 | 11/2002 | Wiegel |
| 6,611,875 B1 | 8/2003 | Chopra et al. |
| 6,615,357 B1 | 9/2003 | Boden et al. |
| 6,662,235 B1 | 12/2003 | Callis et al. |
| 6,678,827 B1 | 1/2004 | Rothermel et al. |
| 6,826,694 B1 | 11/2004 | Dutta et al. |
| 6,907,042 B1 | 6/2005 | Oguchi |
| 6,922,417 B2 | 7/2005 | Vanlint |
| 6,971,028 B1 | 11/2005 | Lyle et al. |
| 7,089,581 B1 | 8/2006 | Nagai et al. |
| 7,095,716 B1 | 8/2006 | Ke et al. |
| 7,107,613 B1 | 9/2006 | Chen et al. |
| 7,143,438 B1 | 11/2006 | Coss et al. |
| 7,152,240 B1 | 12/2006 | Green et al. |
| 7,185,368 B2 | 2/2007 | Copeland, III |
| 7,215,637 B1 | 5/2007 | Ferguson et al. |
| 7,225,269 B2 | 5/2007 | Watanabe |
| 7,225,468 B2 | 5/2007 | Waisman et al. |
| 7,227,842 B1 | 6/2007 | Ji et al. |
| 7,237,258 B1 | 6/2007 | Pantuso et al. |
| 7,237,267 B2 | 6/2007 | Rayes et al. |
| 7,263,099 B1 | 8/2007 | Woo et al. |
| 7,296,288 B1 | 11/2007 | Hill et al. |
| 7,299,353 B2 | 11/2007 | Le Pennec et al. |
| 7,331,061 B1 | 2/2008 | Ramsey et al. |
| 7,370,358 B2 | 5/2008 | Ghanea-Hercock |
| 7,478,429 B2 | 1/2009 | Lyon |
| 7,499,412 B2 | 3/2009 | Matityahu et al. |
| 7,539,186 B2 | 5/2009 | Aerrabotu et al. |
| 7,610,621 B2 | 10/2009 | Turley et al. |
| 7,684,400 B2 | 3/2010 | Govindarajan et al. |
| 7,706,358 B2 | 4/2010 | Kitada |
| 7,710,885 B2 | 5/2010 | Ilnicki et al. |
| 7,721,084 B2 | 5/2010 | Salminen et al. |
| 7,792,775 B2 | 9/2010 | Matsuda |
| 7,814,158 B2 | 10/2010 | Malik |
| 7,814,546 B1 | 10/2010 | Strayer et al. |
| 7,818,794 B2 | 10/2010 | Wittman |
| 7,849,502 B1 | 12/2010 | Bloch et al. |
| 7,913,303 B1 | 3/2011 | Rouland et al. |
| 7,953,014 B2 | 5/2011 | Toda et al. |
| 7,954,143 B2 | 5/2011 | Aaron |
| 7,962,606 B2 | 6/2011 | Barron et al. |
| 7,966,654 B2 | 6/2011 | Crawford |
| 7,990,911 B2 | 8/2011 | Sutivong et al. |
| 7,995,584 B2 | 8/2011 | Eswaran et al. |
| 8,004,994 B1 | 8/2011 | Darisi et al. |
| 8,009,566 B2 | 8/2011 | Zuk et al. |
| 8,037,517 B2 | 10/2011 | Fulp et al. |
| 8,042,149 B2 | 10/2011 | Judge |
| 8,042,167 B2 | 10/2011 | Fulp et al. |
| 8,117,655 B2 | 2/2012 | Spielman |
| 8,156,206 B2 | 4/2012 | Kiley et al. |
| 8,176,561 B1 | 5/2012 | Hurst et al. |
| 8,204,984 B1 | 6/2012 | Aziz et al. |
| 8,219,675 B2 | 7/2012 | Ivershen |
| 8,271,645 B2 | 9/2012 | Rajan et al. |
| 8,306,994 B2 | 11/2012 | Kenworthy |
| 8,307,029 B2 | 11/2012 | Davis et al. |
| 8,331,234 B1 | 12/2012 | Newton et al. |
| 8,413,238 B1 | 4/2013 | Sutton |
| 8,422,391 B2 | 4/2013 | Zhu |
| 8,438,270 B2 | 5/2013 | Nappier et al. |
| 8,495,725 B2 | 7/2013 | Ahn |
| 8,510,821 B1 | 8/2013 | Brandwine et al. |
| 8,621,556 B1 | 12/2013 | Bharali et al. |
| 8,654,626 B2 | 2/2014 | Ichino et al. |
| 8,689,107 B2 | 4/2014 | Dong et al. |
| 8,694,779 B2 | 4/2014 | Gagnon et al. |
| 8,726,379 B1 | 5/2014 | Stiansen et al. |
| 8,789,135 B1 | 7/2014 | Pani |
| 8,806,638 B1 | 8/2014 | Mani |
| 8,832,832 B1 | 9/2014 | Visbal |
| 8,856,926 B2 | 10/2014 | Narayanaswamy et al. |
| 8,923,181 B2 | 12/2014 | Yao et al. |
| 8,930,690 B2 | 1/2015 | Zuo et al. |
| 8,934,384 B2 | 1/2015 | Gunawardena et al. |
| 8,934,487 B2 | 1/2015 | Vogt et al. |
| 8,935,785 B2 | 1/2015 | Pandrangi |
| 8,955,128 B1 | 2/2015 | Trama et al. |
| 9,009,461 B2 | 4/2015 | Martini |
| 9,021,575 B2 | 4/2015 | Martini |
| 9,077,667 B2 | 7/2015 | Sridhar |
| 9,094,445 B2 | 7/2015 | Moore et al. |
| 9,100,352 B2 | 8/2015 | Zha et al. |
| 9,124,552 B2 | 9/2015 | Moore |
| 9,137,205 B2 | 9/2015 | Rogers et al. |
| 9,154,446 B2 | 10/2015 | Gemelli et al. |
| 9,160,713 B2 | 10/2015 | Moore |
| 9,172,627 B2 | 10/2015 | Kjendal et al. |
| 9,264,370 B1 | 2/2016 | Ahn et al. |
| 9,282,017 B2 | 3/2016 | Iizuka et al. |
| 9,342,691 B2 | 5/2016 | Maestas |
| 9,361,085 B2 | 6/2016 | El-Gillani |
| 9,380,489 B2 | 6/2016 | Kotecha et al. |
| 9,407,602 B2 | 8/2016 | Feghali et al. |
| 9,419,942 B1 | 8/2016 | Buruganahalli et al. |
| 9,531,672 B1 | 12/2016 | Li et al. |
| 9,544,135 B2 | 1/2017 | Andoni |
| 9,560,176 B2 | 1/2017 | Ahn et al. |
| 9,608,879 B2 | 3/2017 | Cartwright et al. |
| 9,614,689 B2 | 4/2017 | Cook et al. |
| 9,628,512 B2 | 4/2017 | Prenger et al. |

(56) References Cited

U.S. PATENT DOCUMENTS

| | | |
|---|---|---|
| 9,634,911 B2 | 4/2017 | Meloche |
| 9,686,193 B2 | 6/2017 | Moore |
| 9,979,695 B2 | 5/2018 | Blocher et al. |
| 10,097,510 B2 | 10/2018 | Agrawal et al. |
| 10,142,301 B1 | 11/2018 | Sharifi Mehr et al. |
| 10,250,618 B2 | 4/2019 | Bhogavilli et al. |
| 10,277,553 B2 | 4/2019 | Correll |
| 10,469,453 B2 | 11/2019 | Reddy et al. |
| 10,476,673 B2 | 11/2019 | Higgins et al. |
| 10,530,903 B2 | 1/2020 | Ahn et al. |
| 10,659,573 B2 | 5/2020 | Ahn et al. |
| 10,931,797 B2 | 2/2021 | Ahn et al. |
| 2001/0039579 A1 | 11/2001 | Trcka et al. |
| 2001/0039624 A1 | 11/2001 | Kellum |
| 2002/0015387 A1 | 2/2002 | Houh |
| 2002/0016858 A1 | 2/2002 | Sawada et al. |
| 2002/0038339 A1 | 3/2002 | Ku |
| 2002/0049899 A1 | 4/2002 | Kenworthy |
| 2002/0083345 A1 | 6/2002 | Halliday et al. |
| 2002/0112188 A1 | 8/2002 | Syvanne |
| 2002/0152209 A1 | 10/2002 | Merugu et al. |
| 2002/0164962 A1 | 11/2002 | Mankins et al. |
| 2002/0165949 A1 | 11/2002 | Na et al. |
| 2002/0186683 A1 | 12/2002 | Buck et al. |
| 2002/0198981 A1 | 12/2002 | Corl et al. |
| 2003/0005122 A1 | 1/2003 | Freimuth et al. |
| 2003/0014665 A1 | 1/2003 | Anderson et al. |
| 2003/0018591 A1 | 1/2003 | Komisky |
| 2003/0035370 A1 | 2/2003 | Brustoloni |
| 2003/0051026 A1 | 3/2003 | Carter et al. |
| 2003/0088787 A1 | 5/2003 | Egevang |
| 2003/0097590 A1 | 5/2003 | Syvanne |
| 2003/0105976 A1 | 6/2003 | Copeland |
| 2003/0120622 A1 | 6/2003 | Nurmela et al. |
| 2003/0123456 A1 | 7/2003 | Denz et al. |
| 2003/0142681 A1 | 7/2003 | Chen et al. |
| 2003/0145225 A1 | 7/2003 | Bruton et al. |
| 2003/0154297 A1 | 8/2003 | Suzuki et al. |
| 2003/0154399 A1 | 8/2003 | Zuk et al. |
| 2003/0188192 A1 | 10/2003 | Tang et al. |
| 2003/0212900 A1 | 11/2003 | Liu et al. |
| 2003/0220940 A1 | 11/2003 | Futoransky et al. |
| 2003/0223367 A1 | 12/2003 | Shay et al. |
| 2004/0010712 A1 | 1/2004 | Hui et al. |
| 2004/0015719 A1 | 1/2004 | Lee et al. |
| 2004/0073655 A1 | 4/2004 | Kan et al. |
| 2004/0088542 A1 | 5/2004 | Daude et al. |
| 2004/0093513 A1 | 5/2004 | Cantrell et al. |
| 2004/0098511 A1 | 5/2004 | Lin et al. |
| 2004/0114518 A1 | 6/2004 | MacFaden et al. |
| 2004/0123220 A1 | 6/2004 | Johnson et al. |
| 2004/0131056 A1 | 7/2004 | Dark |
| 2004/0148520 A1 | 7/2004 | Talpade et al. |
| 2004/0151155 A1 | 8/2004 | Jouppi |
| 2004/0172529 A1 | 9/2004 | Culbert |
| 2004/0172557 A1 | 9/2004 | Nakae et al. |
| 2004/0177139 A1 | 9/2004 | Schuba et al. |
| 2004/0181690 A1 | 9/2004 | Rothermel et al. |
| 2004/0193943 A1 | 9/2004 | Angelino et al. |
| 2004/0199629 A1 | 10/2004 | Bomer et al. |
| 2004/0205360 A1 | 10/2004 | Norton et al. |
| 2004/0250124 A1 | 12/2004 | Chesla et al. |
| 2005/0010765 A1 | 1/2005 | Swander et al. |
| 2005/0024189 A1 | 2/2005 | Weber |
| 2005/0071650 A1 | 3/2005 | Jo et al. |
| 2005/0076227 A1 | 4/2005 | Kang et al. |
| 2005/0108557 A1 | 5/2005 | Kayo et al. |
| 2005/0114704 A1 | 5/2005 | Swander |
| 2005/0117576 A1 | 6/2005 | McDysan et al. |
| 2005/0125697 A1 | 6/2005 | Tahara |
| 2005/0138204 A1 | 6/2005 | Iyer et al. |
| 2005/0138353 A1 | 6/2005 | Spies et al. |
| 2005/0141537 A1 | 6/2005 | Kumar et al. |
| 2005/0183140 A1 | 8/2005 | Goddard |
| 2005/0229246 A1 | 10/2005 | Rajagopal et al. |
| 2005/0249214 A1 | 11/2005 | Peng |
| 2005/0251570 A1 | 11/2005 | Heasman et al. |
| 2005/0283823 A1 | 12/2005 | Okajo et al. |
| 2005/0286522 A1 | 12/2005 | Paddon et al. |
| 2006/0031928 A1 | 2/2006 | Conley et al. |
| 2006/0048142 A1 | 3/2006 | Roese et al. |
| 2006/0053491 A1 | 3/2006 | Khuti et al. |
| 2006/0070122 A1 | 3/2006 | Bellovin |
| 2006/0080733 A1 | 4/2006 | Khosmood et al. |
| 2006/0085849 A1 | 4/2006 | Culbert |
| 2006/0104202 A1 | 5/2006 | Reiner |
| 2006/0114899 A1 | 6/2006 | Toumura et al. |
| 2006/0133377 A1 | 6/2006 | Jain |
| 2006/0136987 A1 | 6/2006 | Okuda |
| 2006/0137009 A1 | 6/2006 | Chesla |
| 2006/0146879 A1 | 7/2006 | Anthias et al. |
| 2006/0159028 A1 | 7/2006 | Curran-Gray et al. |
| 2006/0195896 A1 | 8/2006 | Fulp et al. |
| 2006/0212572 A1 | 9/2006 | Afek et al. |
| 2006/0248580 A1 | 11/2006 | Fulp et al. |
| 2006/0262798 A1 | 11/2006 | Joshi et al. |
| 2007/0056038 A1 | 3/2007 | Lok |
| 2007/0083924 A1 | 4/2007 | Lu |
| 2007/0118894 A1 | 5/2007 | Bhatia |
| 2007/0147380 A1 | 6/2007 | Ormazabal et al. |
| 2007/0211644 A1 | 9/2007 | Ottamalika et al. |
| 2007/0240208 A1 | 10/2007 | Yu et al. |
| 2007/0291789 A1 | 12/2007 | Kutt et al. |
| 2008/0005795 A1 | 1/2008 | Acharya et al. |
| 2008/0028467 A1 | 1/2008 | Kommareddy et al. |
| 2008/0043739 A1 | 2/2008 | Suh et al. |
| 2008/0072307 A1 | 3/2008 | Maes |
| 2008/0077705 A1 | 3/2008 | Li et al. |
| 2008/0080493 A1 | 4/2008 | Weintraub et al. |
| 2008/0086435 A1 | 4/2008 | Chesla |
| 2008/0101234 A1 | 5/2008 | Nakil et al. |
| 2008/0163333 A1 | 7/2008 | Kasralikar |
| 2008/0201772 A1 | 8/2008 | Mondaeev et al. |
| 2008/0229415 A1 | 9/2008 | Kapoor et al. |
| 2008/0235755 A1 | 9/2008 | Blaisdell et al. |
| 2008/0279196 A1 | 11/2008 | Friskney et al. |
| 2008/0301765 A1 | 12/2008 | Nicol et al. |
| 2008/0313738 A1 | 12/2008 | Enderby |
| 2008/0320116 A1 | 12/2008 | Briggs |
| 2009/0007219 A1 | 1/2009 | Abzarian et al. |
| 2009/0028160 A1 | 1/2009 | Eswaran et al. |
| 2009/0138938 A1 | 5/2009 | Harrison et al. |
| 2009/0144819 A1 | 6/2009 | Babbar et al. |
| 2009/0150972 A1 | 6/2009 | Moon et al. |
| 2009/0172800 A1 | 7/2009 | Wool |
| 2009/0222877 A1 | 9/2009 | Diehl et al. |
| 2009/0240698 A1 | 9/2009 | Shukla et al. |
| 2009/0262723 A1 | 10/2009 | Pelletier et al. |
| 2009/0262741 A1 | 10/2009 | Jungck et al. |
| 2009/0300759 A1 | 12/2009 | Wang et al. |
| 2009/0328219 A1 | 12/2009 | Narayanaswamy |
| 2010/0011433 A1 | 1/2010 | Harrison et al. |
| 2010/0011434 A1 | 1/2010 | Kay |
| 2010/0082811 A1 | 4/2010 | Van Der Merwe et al. |
| 2010/0095367 A1 | 4/2010 | Narayanaswamy |
| 2010/0107240 A1 | 4/2010 | Thaler et al. |
| 2010/0115621 A1 | 5/2010 | Staniford et al. |
| 2010/0132027 A1 | 5/2010 | Ou |
| 2010/0195503 A1 | 8/2010 | Raleigh |
| 2010/0199346 A1 | 8/2010 | Ling et al. |
| 2010/0202299 A1 | 8/2010 | Strayer et al. |
| 2010/0211678 A1 | 8/2010 | McDysan et al. |
| 2010/0232445 A1 | 9/2010 | Bellovin |
| 2010/0242098 A1 | 9/2010 | Kenworthy |
| 2010/0268799 A1 | 10/2010 | Maestas |
| 2010/0296441 A1 | 11/2010 | Barkan |
| 2010/0303240 A1 | 12/2010 | Beachem et al. |
| 2011/0055916 A1 | 3/2011 | Ahn |
| 2011/0055923 A1 | 3/2011 | Thomas |
| 2011/0088092 A1 | 4/2011 | Nguyen et al. |
| 2011/0141900 A1 | 6/2011 | Jayawardena et al. |
| 2011/0154470 A1 | 6/2011 | Grimes et al. |
| 2011/0185055 A1 | 7/2011 | Nappier et al. |
| 2011/0191467 A1 | 8/2011 | Imbimbo et al. |

(56) References Cited

U.S. PATENT DOCUMENTS

| | | |
|---|---|---|
| 2011/0214157 A1 | 9/2011 | Korsunsky et al. |
| 2011/0270956 A1 | 11/2011 | McDysan et al. |
| 2011/0277034 A1 | 11/2011 | Hanson |
| 2011/0305160 A1 | 12/2011 | Green et al. |
| 2012/0023576 A1 | 1/2012 | Sorensen et al. |
| 2012/0030750 A1 | 2/2012 | Bhargava et al. |
| 2012/0084866 A1 | 4/2012 | Stolfo |
| 2012/0106354 A1 | 5/2012 | Pleshek et al. |
| 2012/0110656 A1 | 5/2012 | Santos et al. |
| 2012/0113987 A1 | 5/2012 | Riddoch et al. |
| 2012/0143650 A1 | 6/2012 | Crowley et al. |
| 2012/0218999 A1 | 8/2012 | McDonald et al. |
| 2012/0240135 A1 | 9/2012 | Risbood et al. |
| 2012/0240185 A1 | 9/2012 | Kapoor et al. |
| 2012/0264443 A1 | 10/2012 | Ng et al. |
| 2012/0290829 A1 | 11/2012 | Altman |
| 2012/0314617 A1 | 12/2012 | Erichsen et al. |
| 2012/0331543 A1 | 12/2012 | Bostrom et al. |
| 2013/0007257 A1 | 1/2013 | Ramaraj et al. |
| 2013/0047020 A1 | 2/2013 | Hershko et al. |
| 2013/0059527 A1 | 3/2013 | Hasesaka et al. |
| 2013/0061294 A1 | 3/2013 | Kenworthy |
| 2013/0081102 A1 | 3/2013 | Beauvais et al. |
| 2013/0104236 A1 | 4/2013 | Ray et al. |
| 2013/0117852 A1 | 5/2013 | Stute |
| 2013/0139236 A1 | 5/2013 | Rubinstein et al. |
| 2013/0254766 A1 | 9/2013 | Zuo et al. |
| 2013/0262655 A1 | 10/2013 | Deschênes et al. |
| 2013/0291100 A1 | 10/2013 | Ganapathy et al. |
| 2013/0305311 A1 | 11/2013 | Puttaswamy Naga et al. |
| 2014/0047112 A1 | 2/2014 | Komiya et al. |
| 2014/0075510 A1 | 3/2014 | Sonoda et al. |
| 2014/0082204 A1 | 3/2014 | Shankar et al. |
| 2014/0082730 A1 | 3/2014 | Vashist et al. |
| 2014/0115654 A1 | 4/2014 | Rogers et al. |
| 2014/0140213 A1 | 5/2014 | Raleigh et al. |
| 2014/0150051 A1 | 5/2014 | Bharali et al. |
| 2014/0201123 A1 | 7/2014 | Ahn et al. |
| 2014/0215561 A1 | 7/2014 | Roberson et al. |
| 2014/0215574 A1 | 7/2014 | Erb et al. |
| 2014/0245423 A1 | 8/2014 | Lee |
| 2014/0259168 A1 | 9/2014 | McNamee et al. |
| 2014/0259170 A1 | 9/2014 | Amsler |
| 2014/0280778 A1 | 9/2014 | Paxton |
| 2014/0280825 A1 | 9/2014 | Agrawal et al. |
| 2014/0281030 A1 | 9/2014 | Cui et al. |
| 2014/0283004 A1 | 9/2014 | Moore |
| 2014/0283030 A1 | 9/2014 | Moore et al. |
| 2014/0283083 A1 | 9/2014 | Gula et al. |
| 2014/0317397 A1 | 10/2014 | Martini |
| 2014/0317737 A1 | 10/2014 | Shin et al. |
| 2014/0321290 A1 | 10/2014 | Jin et al. |
| 2014/0337613 A1 | 11/2014 | Martini |
| 2014/0365372 A1 | 12/2014 | Ross et al. |
| 2014/0366132 A1 | 12/2014 | Stiansen et al. |
| 2015/0033336 A1 | 1/2015 | Wang et al. |
| 2015/0052601 A1 | 2/2015 | White et al. |
| 2015/0106930 A1 | 4/2015 | Honda et al. |
| 2015/0121449 A1 | 4/2015 | Cp et al. |
| 2015/0128274 A1 | 5/2015 | Giokas |
| 2015/0135320 A1* | 5/2015 | Coskun .......... H04L 43/04 726/24 |
| 2015/0135325 A1 | 5/2015 | Stevens et al. |
| 2015/0143107 A1 | 5/2015 | Kale et al. |
| 2015/0207809 A1 | 7/2015 | Macaulay |
| 2015/0237012 A1 | 8/2015 | Moore |
| 2015/0244734 A1 | 8/2015 | Olson et al. |
| 2015/0256431 A1 | 9/2015 | Buchanan et al. |
| 2015/0304354 A1 | 10/2015 | Rogers et al. |
| 2015/0334125 A1 | 11/2015 | Bartos et al. |
| 2015/0341389 A1 | 11/2015 | Kurakami |
| 2015/0347246 A1 | 12/2015 | Matsui et al. |
| 2015/0350229 A1 | 12/2015 | Mitchell |
| 2015/0372977 A1 | 12/2015 | Yin |
| 2015/0373043 A1 | 12/2015 | Wang et al. |
| 2016/0020968 A1 | 1/2016 | Aumann et al. |
| 2016/0028751 A1 | 1/2016 | Cruz Mota et al. |
| 2016/0065611 A1 | 3/2016 | Fakeri-Tabrizi et al. |
| 2016/0080316 A1 | 3/2016 | Gonzalez Pizarro et al. |
| 2016/0094418 A1 | 3/2016 | Raney |
| 2016/0100286 A1 | 4/2016 | Thornycroft et al. |
| 2016/0112443 A1 | 4/2016 | Grossman et al. |
| 2016/0119365 A1 | 4/2016 | Barel |
| 2016/0127417 A1 | 5/2016 | Janssen |
| 2016/0173446 A1 | 6/2016 | Nantel |
| 2016/0191558 A1 | 6/2016 | Davison |
| 2016/0205069 A1 | 7/2016 | Blocher et al. |
| 2016/0219065 A1 | 7/2016 | Dasgupta et al. |
| 2016/0285706 A1 | 9/2016 | Rao |
| 2016/0294870 A1 | 10/2016 | Banerjee et al. |
| 2016/0344708 A1 | 11/2016 | Kawai et al. |
| 2016/0366099 A1 | 12/2016 | Jordan |
| 2017/0223046 A1 | 8/2017 | Singh |
| 2017/0272469 A1 | 9/2017 | Kraemer et al. |
| 2021/0203761 A1 | 7/2021 | Ahn et al. |

FOREIGN PATENT DOCUMENTS

| | | |
|---|---|---|
| CA | 2600236 A1 | 10/2006 |
| EP | 1006701 A2 | 6/2000 |
| EP | 1313290 A1 | 5/2003 |
| EP | 1484884 A2 | 12/2004 |
| EP | 1677484 A2 | 7/2006 |
| EP | 2385676 A1 | 11/2011 |
| EP | 2482522 A1 | 8/2012 |
| EP | 2498442 A1 | 9/2012 |
| EP | 1864226 B1 | 5/2013 |
| EP | 3257202 B1 | 3/2019 |
| EP | 2528299 B1 | 8/2019 |
| EP | 3361695 B1 | 3/2020 |
| GB | 2505288 A | 2/2014 |
| KR | 20010079361 A | 8/2001 |
| WO | 2005046145 A1 | 5/2005 |
| WO | 2006093557 A2 | 9/2006 |
| WO | 2006105093 A2 | 10/2006 |
| WO | 2007/023465 A1 | 3/2007 |
| WO | 2007109541 A2 | 9/2007 |
| WO | 2011038420 A2 | 3/2011 |
| WO | 2012146265 A1 | 11/2012 |
| WO | 2014/001773 A1 | 1/2014 |
| WO | 2016/130196 A1 | 8/2016 |

OTHER PUBLICATIONS

Appendix A, as cited in Complaint of Centripetal Networks, Inc. dated Apr. 19, 2022, Certified Copy of Prosecution History for U.S. Pat. No. 9,264,370, (2 parts), 609 pages.

Appendix C, as cited in Complaint of Centripetal Networks, Inc. dated Apr. 19, 2022, Certified Copy of Prosecution History for United States Patent No. 10, 193,917, 555 pages.

Nov. 29, 2017 (US) Defendant Keysight Technologies, Inc.'s Answer to Complaint for Patent Infringement—Case No. 2:17-cv-00383-HCN-LRL, Document 62, 20 pages.

Statement Re: Related Application, dated Sep. 30, 2015, 1 page, as listed on U.S. Pat. No. 9,264,370.

Jun. 23, 2022, Complainant Centripetal Networks, Inc.'s Notice of Priority and Conception Dates, Investigation No. 337-TA-1314, In the Matter of Certain Computer Network Security Equipment and Systems, Related Software, Components Thereof, and Products Containing Same, 4 pages.

Jun. 8, 2022, Invalidity Action against the European Patent EP3257202B1 with effect for the Federal Republic of Germany, DE application No. 602015026499.1, Court file reference: 5 Ni 50/20 (EP) joinged with 5 Ni 57/21 (EP) Opinion on Judicial Notice, Cisco Systems GmbH and Palo Alto Networks (Netherlands BV) gen Centripetal Networks Inc., 12 pages.

Aug. 10, 2022—Petitioner's Reply to Patent Owner's Response, Case IPR2021-01150, U.S. Pat. No. 10,530,903, 35 pages.

Sep. 21, 2022 Patent Owner's Sur-Reply to Petitioner's Reply, Case IPR2021-01150, U.S. Pat. No. 10,530,903, 33 pages.

(56) References Cited

OTHER PUBLICATIONS

Certified Copy of Judgment In the patent invalidity case, Cisco Systems GmbH, Palo Alto Networks (Netherlands) BV, *Keysight Technologies GmbH* v. *Centripetal Netowrks Inc*, concerning EP3257202, based on oral proceedings of Aug. 1, 2022, 60 pages.
Dec. 28, 2022 (US) Public Version of Respondent's Motion for Summary Determination of Non-Infringement of U.S. Pat. No. 9,264,370, Investigation No. 337-TA-1314, 163 pages.
Jan. 9, 2023 (US) Public Version of Complainant Centripetal Networks, Inc.'s Opposition to Keysight Technology, Inc.'s Motion for Summary Determination (Motion No. 1314-010), Investigation No. 337-TA-1314, 174 pages.
Feb. 15, 2023, US Judgment, Final Written Decision, IPR2021-01150, U.S. Pat. No. 10,530,903 B2, Paper 36, 30 pages.
Exhibit 1025 in IPR2021-01150 and IPR2021-01151—Baba, et al., Tracing Network Attacks to Their Sources, Mar./Apr. 2002, <<http://computer.org/internet/>>, IEEE Internet Computing, 7 pages.
Exhibit 1002 in IPR2021-01151—File History of U.S. Pat. No. 10,659,573, issued May 19, 2020.
Exhibit 1003 in IPR2021-01151—Declaration of Dr. Robert Akl, D.Sc, U.S. Pat. No. 10,659,573, executed Jul. 20, 2021, 191 pages.
Petition for Inter Partes Review—IPR2021-01150, U.S. Pat. No. 10,530,903, executed Jul. 20, 2021, 78 pages.
Petitioner's Power of Attorney Under 37 CFR § 42.10(b), IPR2021-01150, U.S. Pat. No. 10,530,903, executed Jul. 13, 2021, 3 pages.
Petition for Inter Partes Review—IPR2021-01151, U.S. Pat. No. 10,659,573, executed Jul. 20, 2021, 85 pages.
Petitioner's Power of Attorney Under 37 CFR § 42.10(b), IPR2021-01151, U.S. Pat. No. 10,659,573, executed Jul. 13, 2021, 3 pages.
Petitioner's Power of Attorney Under 37 C.F.R. § 42.10(b), PGR2021-00108, U.S. Pat. No. 10,931,797, executed Jul. 13, 2021, 3 pages.
Petition for Post-Grant Review, PGR2021-00108, U.S. Pat. No. 10,931,797, executed Aug. 3, 2021, 106 pages.
Exhibit 1002 in PGR2021-00108—File History of U.S. Pat. No. 10,931,797, 339 pages.
Exhibit 1003 in PGR2021-00108—Declaration of Dr. Robert Akl, D.Sc., PGR2021-00108, U.S. Pat. No. 10,931,797, executed Aug. 3, 2021, 209 pages.
Exhibit 1017 in PGR2021-00108—Petition for Inter Partes Review Under 35 U.S.C. §312 and 37 C.F.R. §42.104, IPR2018-01654, U.S. Pat. No. 9,560, 176, executed Sep. 17, 2018, 78 pages.
Exhibit 1018 in PGR2021-00108—Petition for Inter Partes Review Under 35 U.S.C. §312 and 37 C.F.R. §42, 104, IPR2018-01655, U.S. Pat. No. 9,560, 176, executed Sep. 17, 2018, 86 pages.
Exhibit 1019 in PGR2021-00108—Jul. 14, 2021, Email re PAN scheduling and discovery, Civil Action No. 2:21-cv-00137-RCY-RJK, Initial Pretrial Conference 9 pages.
Exhibit 1020 in PGR2021-00108—Amended Complaint for Patent Infringement, Case 2:21-cv-00137-RCY-RJK, Document 65, filed Jul. 9, 2021, 167 pages.
Exhibit 1022 in PGR2021-00108—RFC: 793, Transmission Control Protocol, DARPA Internet Program, Protocol Specification, Sep. 1981, 91 pages.
Exhibit 1023 in PGR2021-00108—Golnabi, et al., "Analysis of Firewall Policy Rules Using Data Mining Techniques," 2006 IEEE, 11 pages.
Exhibit 1024 in PGR2021-00108, Dantu, et al., "Dynamic Control of Worm Propagation," Proceedings of the International Corporation Conference on Information Technology: Coding and Computing (ITCC'04), 2004 IEEE, 5 pages.
Exhibit 1025 in PGR2021-00108—Baba, "Tracing Network Attacks to Their Sources, " http://computer.org/internet/, Mar./Apr. 2002, IEEE Internet Computing, 7 pages.
Exhibit 1031 in PGR2021-00108—Jul. 21, 2021, Minute Entry for Initial Pretrial Conference, 1 page.
Nov. 19, 2021—Patent Owner's Preliminary Response Under 37 C.F.R. § 42.107, Case No. IPR2021-01150, U.S. Pat. No. 10,530,903, *Palo Alto Networks, Inc.* v. *Centripetal Networks, Inc.*, 50 pages.

Feb. 16, 2022—Decision Granting Institution of Inter Partes Review 37 C.F.R. § 42.108, IPR2021-01150, U.S. Pat. No. 10,530,903 B2, *Palo Alto Networks, Inc* v. *Centripetal Networks, Inc.*, 51 pages.
Dec. 28, 2021—Patent Owner's Preliminary Response Under 37 C.F.R. § 42.107, Case IPR2021-01521, U.S. Pat. No. 9,560,176, *Palo Alto Networks, Inc.* v. *Centripetal Networks, Inc.*, 71 pages.
Exhibit 1003—Declaration of Dr. Robert Akl, D.Sc., IPR2021-01521, U.S. Pat. No. 9,560, 176, *Palo Alto Networks, Inc.* v. *Centripetal Networks, Inc.*, Sep. 15, 2021, 148 pages.
Sep. 15, 2021—Petition for Inter Partes Review, Case IPR2021-01521, U.S. Pat. No. 9,560,176, *Palo Alto Networks, Inc.* v. *Centripetal Networks, Inc.*, 64 pages.
Nov. 24, 2021—Patent Owner's Preliminary Response Under 37 C.F.R. § 42.207, Case No. PGR2021-00108, U.S. Pat. No. 10,931,797, *Palo Alto Networks, Inc.* v. *Centripetal Networks, Inc.*, 74 pages.
Feb. 22, 2022—Decision Denying Post-Grant Review 37 CFR § 42.208, Case PGR2021-00108, U.S. Pat. No. 10,931,797, *Palo Alto Networks, Inc.* v. *Centripetal Networks, Inc.*, 27 pages.
Nov. 19, 2021—Patent Owner's Preliminary Response Under 37 C.F.R. § 42.107, Case No. IPR2021-01151, U.S. Pat. No. 10,659,573, *Palo Alto Networks, Inc.* v. *Centripetal Networks, Inc.*, 49 pages.
Feb. 16, 2022—Decision Denying Institution of Inter Partes Review 35 U.S.C. § 314, IPR2021-01151, U.S. Pat. No. 10,659,573 B2, *Palo Alto Networks, Inc.*v. *Centripetal Networks, Inc.*, 30 pages.
Mar. 24, 2022—Case IPR2021-01521, U.S. Pat. No. 9,560,176 B2, Decision Denying Inter Partes Review 37 C.F.R. § 42.108, 20 pages.
K. Ingham, et al., "A History and Survey of Network Firewalls," ACM Journal Name, vol. V, No. N, Month 20YY, date of publication unknown but, prior to Oct. 29, 2021, pp. 1-42.
May 18, 2022—Patent Owner's Response—Case IPR2021-01150, U.S. Pat. No. 10,530,903, 67 pages.
Exhibit 2001 listed in Patent Owner's Response dated May 18, 2022, in IPR2021-01150—Declaration of Hannah Lee In Support of Plaintiff Centripetal Networks, Inc.'s Opposition to Defendant Palo Alto Networks, Inc.'s Motion to Stay, with Exhibits 1 and 4, *Centripetal Networks, Inc.* v. *Palo Alto Networks, Inc.*, Case No. 2:21-cv-00137 (RCY), Dkt. No. 36 (E.D. Va. Jul. 23, 2021).
Exhibit 2002 listed in Patent Owner's Response dated May 18, 2022, in IPR2021-01150—Protective Order, *Centripetal Networks, Inc.* v. *Palo Alto Networks, Inc.*, Case No. 2:21-cv-00137-RCY-RJK, Dkt. No. 93 (E.D. Va. Jul. 30, 2021) ("Protective Order"), 36 pages.
Exhibit 2003 listed in Patent Owner's Response dated May 18, 2022, in IPR2021-01150—Amended Complaint for Patent Infringement, *Centripetal Networks, Inc.* v. *Palo Alto Networks, Inc.*, Case No. 2:21-cv-00137-RCY, Dkt. No. 65 (E.D. Va. Jul. 9, 2021), 167 pages.
Exhibit 2004 listed in Patent Owner's Response dated May 18, 2022, in IPR2021-01150—Order Regarding Discovery pf Electronically Stored Information ("ESI"), *Centripetal Networks, Inc.* v. *Palo Alto Networks, Inc.*, Case No. 2:21-cv-00137-AWA-RJK, Dkt. No. 155 (E.D. Va. Sep. 13, 2021) ("ESI Order"), 14 pages.
Exhibit 2005 listed in Patent Owner's Response dated May 18, 2022, in IPR2021-01150—Memorandum in Support of Defendant's Motion to Stay Pending Resolution of Inter Partes Review Proceedings, *Centripetal Networks, Inc.* v. *Palo Alto Networks, Inc.*, Case No. 2:21-cv-00137-RCY-RJK, Dkt. No. 68 (E.D. Va. Jul. 9, 2021), 19 pages.
Exhibit 2006 listed in Patent Owner's Response dated May 18, 2022, in IPR2021-01150—Declaration of James Hannah in Support of Patent Owner's Preliminary Response, Case No. IPR2021-01150, U.S. Pat. No. 10,593,903, Nov. 1, 20219, 4 pages.
Exhibit 2007 listed in Patent Owner's Response dated May 18, 2022, in IPR2021-01150—Order, *Bushnell Hawthorne LLC* v. *Cisco Sys., Inc.*, Case No. 1:18-cv-00760-TSE-MSN, Dkt. No. 88 (E.D. Va. Apr. 22. 2019), 2 pages.
Exhibit 2008 listed in Patent Owner's Response dated May 18, 2022, in IPR2021-01150—Memorandum Order, *Cont'l Auto. Sys. Inc.* v. *Hamaton Auto. Tech. Co. Ltd*, Case No. 2:16-cv-00226-RAJ-LRL, Dkt. No. 63 (E.D. Va. Feb. 7, 2017), 10 pages.
Exhibit 2010 listed in Patent Owner's Response dated May 18, 2022, in IPR2021-01150—Decision Denying Inter Partes Review,

(56) References Cited

OTHER PUBLICATIONS

*Cisco Sys., Inc.* v. *Centripetal Networks, Inc.*, No. IPR2018-01654, Paper 7 (P.T.A.B. May 6, 2019), 23 pages.
Exhibit 2011 listed in Patent Owner's Response dated May 18, 2022, in IPR2021-01150—Decision Denying Inter Partes Review, *Cisco Sys., Inc.* v. *Centripetal Networks, Inc.*, No. IPR2018-01655, Paper 7 (P.T.A.B. May 6, 2019), 23 pages.
Exhibit 2015 listed in Patent Owner's Response dated May 18, 2022, in IPR2021-01150—Excerpts from Palo Alto Networks, Inc.'s First Supplemental Objections and Responses to Plaintiff's Interrogatory No. 4, *Centripetal Networks, Inc.* v. *Palo Alto Networks, Inc.*, Case No. 2:21-cv-00137-RCY-RJK (E.D. Va.), dated Oct. 22, 2021, 37 pages.
Exhibit 2016 listed in Patent Owner's Response dated May 18, 2022, in IPR2021-01150—E-mail Correspondence between the Board and Counsel of Record, dated between Dec. 8, 2021, through Dec. 9, 2021, 2 pages.
Exhibit 2017 listed in Patent Owner's Response dated May 18, 2022, in IPR2021-01150—Defendant Palo Alto Networks, Inc.'s Request for Hearing on its Motion to Compel Plaintiff Centripetal Networks, Inc. to Produce Related Patent Documents, *Centripetal Networks, Inc.* v. *Palo Alto Networks, Inc.*, Case No. 2:21-cv-00137-RCY-RJK (E.D. Va.), Dkt. 207, dated Nov. 30, 2021, 3 pages.
Exhibit 2018 listed in Patent Owner's Response dated May 18, 2022, in IPR2021-01150—Plaintiff Centripetal Networks, Inc.'s Memorandum in Support of its Motion to Compel Defendant Palo Alto Networks, Inc. to Produce 30(b) (6) Witnesses, Certain Documents, and Source Code, *Centripetal Networks, Inc.* v. *Palo Alto Networks, Inc.*, Case No. 2:21-cv-00137-RCY-RJK (E.D. Va.), Dkt. 212, dated Dec. 2, 2021, 24 pages.
Exhibit 2019 listed in Patent Owner's Response dated May 18, 2022, in IPR2021-01150—Declaration of Dr. Michael T. Goodrich, Ph.D. in Support of Patent Owner's Response, Cases IPR2021-01150, U.S. Pat. No. 10,530,903, May 1, 20228, 102 pages.
Exhibit 2020 listed in Patent Owner's Response dated May 18, 2022, in IPR2021-01150—Deposition Transcript of Robert Akl, D.Sc., *Palo Alto Networks, Inc.* v. *Centripetal Networks, Inc.*, No. IPR2021-01150 (P.T.A.B.), taken May 10, 2022, 56 pages.
Exhibit 2021 listed in Patent Owner's Response dated May 18, 2022, in IPR2021-01150—Oracle System Administration Guide: IP Services, "Interface ID," available from https://docs.oracle.com/cd/E19120-01/open.solaris/819-3000/ipv6-overview-16/index.html, Oracle Corporation (2010), printout dated Apr. 3, 2022, 1 page.
Exhibit 2022 listed in Patent Owner's Response dated May 18, 2022, in IPR2021-01150—CCNA Study Guide, "IPv6 Interface identifier," archived May 16, 2014, available from https://web.archive.org/web/20140516073045/http://study-ccna.com/ipv6-interface-identifier/, printout dated Apr. 5, 2022, 2 pages.
"Cisco ACNS Software Configuration Guide for Centrally Managed Deployments," Release 5.5. Text Part No. OL-9136-01, Cisco Systems, Inc., 2006, 944 pages.
"Control Plane Policing Implementation Best Practices"; Cisco Systems; Mar. 13, 2013; <https://web.archive.org/web/20130313135143/http:www.cisco.com/web/about/security/intelligence/coppwp_gs.html>.
"Examining SSL-encrypted Communications: Netronome SSL InspectorTM Solution Overview," Jan. 1, 2008, XP055036015, retrieved from <http://www.infosecurityproductsguide.com/technology/2008/Netronome_Examining_SSL-encrypted_Communications.pdf>, 8 pages.
Sep. 11, 2006—(WO) Written Opinion of the International Searching Authority—App PCT/US05/47008.
Aug. 31, 2007—(EP) Communication Pursuant to Rules 109 and 110—App 05857614.1.
Jul. 3, 2008—(WO) Written Opinion of the International Searching Authority—App PCT/US06/11291.
Jun. 24, 2009—U.S. Office Action—U.S. Appl. No. 11/390,976.
Sep. 14, 2009 U.S. Office Action—U.S. Appl. No. 11/316,331.
Apr. 29, 2010—U.S. Interview Summary—U.S. Appl. No. 11/390,976.
Aug. 20, 2010—(AU) Office Action—App 2005328336.
Jun. 23, 2010—U.S. Final Rejection—U.S. Appl. No. 11/316,331.
Mar. 26, 2010—U.S. Final Rejection—U.S. Appl. No. 11/390,976.
Sep. 10, 2010—(AU) Office Action—App 2006230171.
Sep. 30, 2010—U.S. Office Action—U.S. Appl. No. 11/390,976.
Apr. 27, 2011—(WO) International Search Report and Written Opinion—App PCT/US2010/054520.
Aug. 25, 2011—U.S. Non Final Rejection—U.S. Appl. No. 12/871,806.
Feb. 14, 2011—(EP) Search Report—App 06758213.0.
Jun. 9, 2011—U.S. Notice of Allowance—U.S. Appl. No. 11/390,976.
Mar. 3, 2011—(EP) Communication Pursuant to Rules 70(2) and 70a(2)—App 06758213.0.
Mar. 4, 2011—U.S. Notice of Allowance—U.S. Appl. No. 11/316,331.
Nov. 11, 2011—(AU) Second Office Action—App 2006230171.
Oct. 18, 2011—(EP) Communication Pursuant to Article 94(3)—App 06 758 213.0.
Aug. 7, 2012—U.S. Non Final Rejection—U.S. Appl. No. 12/871,806.
Feb. 6, 2012—U.S. Final Rejection—U.S. Appl. No. 12/871,806.
Jun. 9, 2012—(AU) Notice of Acceptance—App 2006230171.
Jun. 26, 2012—(EP) Extended Search Report—App 05857614.1.
Nov. 20, 2012—(EP) Communication under rule 71(3)—App 06 758 213.0.
Nov. 26, 2012—U.S. Final Rejection—U.S. Appl. No. 12/871,806.
Apr. 4, 2013—U.S. Notice of Allowance—U.S. Appl. No. 12/871,806.
Apr. 18, 2013—(EP) Decision to Grant a European Patent—App 06758212.0.
Jan. 16, 2013—(CA) Office Action—App 2,594,020.
Jan. 17, 2013—(CA) Office Action—App 2,600,236.
Nov. 7, 2013 (WO) International Search Report—App. PCT/US2013/057502.
Jun. 24, 2014 (WO) International Search Report—App. PCT/US2014/023286.
Jun. 26, 2014 (WO) International Search Report—App. PCT/US2014/027723.
Mar. 24, 2014 (WO) International Search Report—App. PCT/US2013/072566.
May 26, 2014—(CA) Office Action—App 2010297968.
Apr. 28, 2015 (WO) International Preliminary Report on Patentability—App. PCT/US2013/057502, dated Apr. 28, 2015.
Dec. 22, 2015—U.S. Final Office Action—U.S. Appl. No. 14/714,207.
Jan. 14, 2015—(EP) Extended Search Report—App 10819667.6.
Jul. 10, 2015—(WO) Communication Relating to the Results of the Partial International Search for International App—PCT/US2015/024691.
Jul. 14, 2015—(WO) International Preliminary Report on Patentability—App PCT/US2013/072566.
May 14, 2015—U.S. Non Final Rejection—U.S. Appl. No. 13/940,240.
May 25, 2015—(AU) Notice of Acceptance—App 2010297968.
Nov. 2, 2015—(AU) Office Action—App 2013372879.
Nov. 27, 2015—U.S. Final Rejection—U.S. Appl. No. 13/940,240.
Sep. 15, 2015 (WO) International Preliminary Report on Patentability—App.—PCT/US2014/027723.
Sep. 15, 2015 (WO) International Preliminary Report on Patentability—App. PCT/US2014/023286.
Sep. 16, 2015 (WO) International Search Report and Written Opinion—App. No. PCT/US2015/024691.
Sep. 4, 2015 U.S. Notice of Allowance—U.S. Appl. No. 14/702,755.
Aug. 29, 2018 (CA) Office Action—App. 2,888,935.
Aug. 9, 2018 U.S. Non-Final Office Action—U.S. Appl. No. 15/413,947.
Dec. 18, 2018 U.S. Final Office Action—U.S. Appl. No. 15/610,995.
Jul. 11, 2018 (US) Declaration of Kevin Jeffay, PhD in Support of Petition for Inter Partes Review of U.S. Pat. No. 9,565,213—IPR2018-01386.
Jul. 12, 2018 (US) Petition for Inter Partes Review of U.S. Pat. No. 9,565,213—IPR2018-01386.
Jul. 13, 2018 U.S. Notice of Allowance—U.S. Appl. No. 15/414,117.
Jul. 20, 2018 (US) Declaration of Dr. Stuart Staniford in Support of Petition for Inter Partes Review of U.S. Pat. No. 9,124,552—IPR2018-01436.
Jul. 20, 2018 (US) Declaration of Dr. Stuart Staniford in Support of Petition for Inter Partes Review of U.S. Pat. No. 9,160,713—IPR2018-01437.

(56) References Cited

OTHER PUBLICATIONS

Jul. 20, 2018 (US) Petition for Inter Partes Review of U.S. Pat. No. 9,124,552—IPR2018-01436.
Jul. 20, 2018 (US) Petition for Inter Partes Review of U.S. Pat. No. 9,160,713—IPR2018-01437.
Jul. 26, 2018 (US) Declaration of Kevin Jeffay, PhD in Support of First Petition for Inter Partes Review of U.S. Pat. No. 9, 137,205—IPR2018-01443.
Jul. 26, 2018 (US) Declaration of Kevin Jeffay, PhD in Support of Second Petition for Inter Partes Review of U.S. Pat. No. 9,137,205—IPR2018-01444.
Jul. 27, 2018 (US) First Petition for Inter Partes Review of U.S. Pat. No. 9,137,205—IPR2018-01443.
Jul. 27, 2018 U.S. Non-Final Office Action—U.S. Appl. No. 15/382,806.
Jul. 2, 20187 (US) Second Petition for Inter Partes Review of U.S. Pat. No. 9,137,205—IPR2018-01444.
Jul. 5, 2018 U.S. Non-Final Office Action—U.S. Appl. No. 15/413,750.
Mar. 15, 2018 (EP) Second Communication pursuant to Article 94(3) EPC—App. 13765547.8.
Mar. 16, 2018 (EP) Communication Pursuant to Rule 164(2)(b) and Article 94(3) EPC—App. 15722292.8.
Mar. 21, 2018 (AU) First Examination Report—App. 2015382393.
Mar. 8, 2018 U.S. Non-Final Office Action—U.S. Appl. No. 14/745,207.
May 25, 2018 U.S. Notice of Allowance—U.S. Appl. No. 15/413,834.
Nov. 14, 2018 U.S. Final Office Action—U.S. Appl. No. 14/745,207.
Oct. 12, 2018 U.S. Non-Final Office Action—U.S. Appl. No. 16/039,896.
Oct. 4, 2018 U.S. Non-Final Office Action—U.S. Appl. No. 16/030,374.
Oct. 4, 2018 U.S. Notice of Allowance—U.S. Appl. No. 15/827,477.
Sep. 17, 2018 (US) Declaration of Narasimha Reddy Ph.D., in Support of Petition for Inter Partes Review of U.S. Pat. No. 9,560,176 (First)—IRP2018-01654.
Sep. 17, 2018 U.S. Declaration of Narasimha Reddy Ph.D., in Support of Petition for Inter Partes Review of U.S. Pat. No. 9,560,176 (Second)—IRP2018-01655.
Sep. 17, 2018 (US) Petition for Inter Partes Review of U.S. Pat. No. 9,560,176 (First)—IPR 2018-01654.
Sep. 17, 2018 (US) Petition for Inter Partes review of U.S. Pat. No. 9,560,176 (Second)—IPR2018-01655.
Sep. 27, 2018 (WO) International Search Report and Written Opinion—App. PCT/US2018/043367.
Sep. 4, 2018 (WO) International Search Report and Written Opinion—App. PCT/US2018/041355.
Sep. 27, 2018 U.S. Non-Final Office Action—U.S. Appl. No. 15/614,956.
Apr. 2, 2019 (US) Decision—Institution of Inter Partes Review of U.S. Pat. No. 9,560,077—IPR 2018-01513.
Apr. 8, 2019 U.S. Final Office Action—U.S. Appl. No. 15/413,947.
Aug. 2, 2019 (CA) Office Action—App. 2,888,935.
Aug. 2, 2019 U.S. Non-Final Office Action—U.S. Appl. No. 16/448,969.
Feb. 21, 2019 U.S. Final Office Action—U.S. Appl. No. 15/382,806.
Feb. 6, 2019 U.S. Final Office Action—U.S. Appl. No. 15/413,750.
Feb. 6, 2019 U.S. Notice of Allowance and Fees Due—U.S. Appl. No. 16/039,896.
Jan. 24, 2019 (US) Decision—Institution of Inter Partes Review of U.S. Pat. No. 9,124,552 B2—IPR 2018-01436.
Jan. 24, 2019 (US) Decision—Institution of Inter Partes Review of U.S. Pat. No. 9,160,713 B2—IPR 2018-01437.
Jan. 24, 2019 U.S. Notice of Allowance—U.S. Appl. No. 15/610,995.
Jul. 5, 2019 (EP) Extended European Search Report—App. 19179539.2.
Jun. 3, 2019 (EP) Communication pursuant to Article 94(3) EPC—Third Examination Report—App. 13765547.8.
Jun. 3, 2019 U.S. Final Office Action—U.S. Appl. No. 15/614,956.
Mar. 1, 20191 U.S. Final Office Action—U.S. Appl. No. 16/030,354.
Mar. 18, 2019 (AU) First Examination Report—App. 2016379156.
Mar. 8, 2019 U.S. Notice of Allowance and Fees Due—U.S. Appl. No. 16/030,374.
Mar. 8, 2019 U.S. Notice of Allowance and Fees Due—U.S. Appl. No. 16/060,374.

May 23, 2019 U.S. Non-Final Office Action—U.S. Appl. No. 14/745,207.
Exhibit 2023 listed in Patent Owner's Response dated May 18, 2022, in IPR2021-01150—Excerpt from Newton's Telecom Dictionary (24th Ed.), Flatiron Publishing (Mar. 2008), 4 pages.
Exhibit 2024 listed in Patent Owner's Response dated May 18, 2022, in IPR2021-01150—MDN Web Docs Glossary, "port," available from https://developer.mozilla.org/en-us/docs/Glossary/Port, printout dated May 11, 2022, 1 page.
Exhibit 2025 listed in Patent Owner's Response dated May 18, 2022, in IPR2021-01150—TCP/IP Network Administration, Ch. 2.7, "Protocols, Ports, and Sockets," available from http://web.deu.edu.tr/doc/oreily/networking/tcpip/ch02_07.htm, printout dated May 11, 2022, 4 pages.
Exhibit 2027 listed in Patent Owner's Response dated May 18, 2022, in IPR2021-01150—The Wayback Machine, The TCP/IP Guide, "IP Addressing Overview and Fundamentals," archived Feb. 14, 2014, available from https://web.archive.org/web/20140214132048/http://www.tcpipguide.com/free/t_IPAddressingOverviewandFundamentals.htm, 2 pages.
Exhibit 2028 listed in Patent Owner's Response dated May 18, 2022, in IPR2021-01150—Excerpt from Newton's Telecom Dictionary (17th Ed.), CMP Books (Feb. 2001), 3 pages.
Exhibit 2029 listed in Patent Owner's Response dated May 18, 2022, in IPR2021-01150 - The Britannica Dictionary, "Response," available from http://www.britannica.com/dictionary/response, printout dated Apr. 19, 2022, 1 page.
Exhibit 2030 listed in Patent Owner's Response dated May 18, 2022, in IPR2021-01150—Oxford Learner's Dictionaries, "Response," available from https://www.oxfordlearnersdictionaries.com/US/definition/english/response, printout dated Apr. 19, 2022, 3 pages.
Exhibit 2031 listed in Patent Owner's Response dated May 18, 2022, in IPR2021-01150—Microsoft Documentation, "Network interfaces," available from https://docs/microsoft.com/en-us/windows/win32/network-interfaces, printout dated Apr. 12, 2022, 4 pages.
Zwicky, Elizabeth D., et al., "Buidling Internet Firewalls," Second Edition, Jun. 2000, as cited in Response to Preliminary Opinion dated Jun. 8, 2022, 7 pages.
Jun. 8, 2022—Response to Preliminary Opinion BP, *Cisco Systems GmbH, et al.,* v. *Centripetal Networks, Inc.,* Including machine translation, 42 pages.
Wikipedia, Wireshark, printed May 17, 2022, as cited in Response to Preliminary Opinion dated Jun. 8, 2022, 6 pages.
Bildschirmfotos YouTube Video Wireshark Tutorial—ACL Generator, (https://www.youtube.com/watch?v=tvH7zZBxOGQ), veröffentlicht am May 5, 2012, as cited in Response to Preliminary Opinion dated Jun. 8, 2022, 2 pages.
Feb. 3, 2013, Fortunato, NAT Packet Analysis Using Wireshark, printed May 17, 2022, as cited in Response to Preliminary Opinion dated Jun. 8, 2022, 2 pages.
Bildschirmfotos YouTube Video Multirace NAT analysis Using Wireshark, "Multitrace NAT analysis Using Wireshark," (https://www.youtube.com/watch?v=J9FzaFryQlw), veröffentlicht Jan. 1, 2013, as cited in Response to Preliminary Opinion dated Jun. 8, 2022, 1 page.
Jun. 8, 2022—Response to Preliminary Opinion HoLo—Opinion on the judicial notice under Sec. 83 (1) Patent Act of Apr. 25, 2022, *Cisco Systems GmbH and Palo Alto Networks (Netherlands) BV* v. *Centripetal Networks, Inc.,* with English translation, 46 pages.
Jun. 8, 2022—Response to Preliminary Opinion MFG, *Cisco Systems gmmbH and Palo Alto Networks (Netherlands) BV* v. *Centripetal Networks Inc.,* with English translation, 10 pages.
Jun. 13, 2022—Respondent Keysight Technologies, Inc.'s Response to the Complaint and Notice of Investigation, In the Matter of Certain Computer Network Security Equipment & Systems, Related Software, Components Thereof, & Products Containing Same, Inv. No. 337-TA-1314, 62 pages.
Apr. 29, 2022, First Public Supplement to the Complaint and Exhibits, Certain Computer Network Security Equipment and Systems, Related Software, Components Thereof, and Products Containing Same, Inv. No. 337-TA-3614, 43 pages.

(56) References Cited

OTHER PUBLICATIONS

Apr. 19, 2022, Public Complaint, Certain Computer Network Security Equipment and Systems, Related Software, Components Thereof, and Products Containing Same Inv. No. 337-TA-, 71 pages.
May 24, 2022, Tuesday, Federal Register, Notice of Institution of Investigation, vol. 87, No. 100, Notices, 2 pages.
Jun. 1, 2022, Order No. 3: Initial Determination Setting a Target Date, In the Matter of Certain Computer Network Security Equipment and Systems, Related Software, Components Thereof, and Products Containing Same, Inv. No. 337-TA-1314, 1 page.
May 18, 2022, Notice of Institution of Investigation, in the Matter of Certain Computer Network Security Equipment and Systems, Related Software, Components Thereof, and Products Containing Same, Inv. No. 337-TA-1314, 13 pages.
Jun. 13, 2022, Respondent Keysight Technologies, Inc.'s Response to the Complaint and Notice of Investigation, In the Matter of Certain Computer Network Security Equipment & Systems, Related Software, Components Thereof, & Products Containing Same, Inv. No. 337-TA-131, 62 pages.
Jun. 13, 2022, Public Version of Exhibit 1, Confidential Exhibit 1 to Keysight Technologies, Inc.'s Response to the Complaint and Notice of Investigation, In the Matter of Certain Computer Network Security Equipment and Systems, Related Software, Components Thereof, and Products Containing Same, Inv. No. 337-TA-1314, 5 pages.
Apr. 20, 2022, Notice of Receipt of Complaint; Solicitation of Comments Relating to the Public Interest, U.S. International Trade Commission, 3 pages.
Exhibit 1, as cited in Complaint of Centripetal Networks, Inc., dated Apr. 19, 2022, Certified Copy of U.S. Pat. No. 9,264,370, 41 pages.
Exhibit 2, as cited in Complaint of Centripetal Networks, Inc., dated Apr. 19, 2022, Certified Copy of U.S. Pat. No. 10,193,917, 45 pages.
Exhibit 3, as cited in Complaint of Centripetal Networks, Inc., dated Apr. 19, 2022, Certified Copy of U.S. Pat. No. 10,284,526, 28 8 pages.
Exhibit 4, as cited in Complaint of Centripetal Networks, Inc. dated Apr. 19, 2022, Press Release: Centripetal Named SINET 16 Innovator for 2017, <<https://www.centripetal.ai/centripetal-named-sinet-16-innovator/>>, dated Oct. 31, 2017, 4 pages.
Exhibit 5, as cited in Compaint of Centripetal Networks, Inc. dated Apr. 19, 2022, Press Release: Centripetal Networks Named a 2017 Gartner "Cool Vendor" in Security, dated Jul. 25, 2017, 4 pages.
Exhibit 6, as cited in Complaint of Centripetal Networks, Inc. dated Apr. 19, 2022, Press Release: Centripetal Ranked No. 93 of the Fastest Growing Companies in North America on Deloitte's 2019 Technology Fast 500, dated Dec. 2, 2019, 4 pages.
Exhibit 7, as cited in Complaint of Centripetal Networks, Inc. dated Apr. 19, 2022, ComPress Release: Centripetal Features in Deloitte's 2020 Technology Fast 500, dated Dec. 1, 2020, <<https://www.centripetal.ai/ deloittes-2020-technology-fast-500/>>, 4 pages.
Exhibit 8, as cited in Complaint of Centripetal Networks, Inc. dated Apr. 19, 2022, Deloitte 2021 Technology Fast 500 Rankings, updated Nov. 2021, 16 pages.
Exhibit 9, as cited in Complaint of Centripetal Networks, Inc. dated Apr. 19, 2022, SC Media Article: Finalists: Best Threat Intelligence Technology, dated Mar. 29, 2021, The Wayback Machine—<<http://web.archive.org/web/20210430232211/https://www.scmagazine.co . . . >>, 8 pages.
Exhibit 10, as cited in Complaint of Centripetal Networks, Inc. dated Apr. 19, 2022, Centripetal Data Sheet: RuleGATE 2000 Gateway, dated 2017, 3 pages.
Exhibit 11, as cited in Complaint of Centripetal Networks, Inc. dated Apr. 19, 2022, Centripetal Webpage: CleanINTERNET, dated Feb. 8, 2022, 25 pages.
Exhibit 12, as cited in Complaint of Centripetal Networks, Inc. dated Apr. 19, 2022, Public Version, Declaration of Jonathan Rogers in Support of Complaint of Centripetal Networks, Inc., dated Apr. 18, 2022, 9 pages.
Exhibit 13, as cited in Complaint of Centripetal Networks, Inc. dated Apr. 19, 2022, Centripetal Case Study: Financial Services Organization Sees Success with Smarter Threat Intelligence, dated 2018, 3 pages.
Exhibit 14, as cited in Complaint of Centripetal Networks, Inc. dated Apr. 19, 2022, Centripetal Case Study: Insurance Company Gains Real-Time Networks Enforcement, dated 2018, 2 pages.
Exhibit 15, as cited in Complaint of Centripetal Networks, Inc. dated Apr. 19, 2022, Centripetal Case Study: Retailer Safeguards Network with Advanced Security Solutions, dated 2018, 3 pages.
Exhibit 16, as cited in Complaint of Centripetal Networks, Inc. dated Apr. 19, 2022, Certified Assignments for U.S. Pat. No. 9,264,370, 30 pages.
Exhibit 17, as cited in Complaint of Centripetal Networks, Inc. dated Apr. 19, 2022, Certified Assignments for U.S. Pat. No. 10,193,917, 12 pages.
Exhibit 18, as cited in Complaint of Centripetal Networks, Inc. dated Apr. 19, 2022, Certified Assignments for U.S. Pat. No. 10,284,526, 5 pages.
Exhibit 19, as cited in Complaint of Centripetal Networks, Inc. dated Apr. 19, 2022, Keysight Webpage: ThreatARMOR: Threat Intelligence Gateway, dated Jan. 5, 2022, 7 pages.
Exhibit 20, as cited in Complaint of Centripetal Networks, Inc. dated Apr. 19, 2022, Keysight Webpage: Application and Threat Intelligence (Subscription), dated Feb. 3, 2022, 4 pages.
Exhibit 21, as cited in Complaint of Centripetal Networks, Inc. dated Apr. 19, 2022, Infringement Chart for U.S. Pat. No. 9,264,370, 52 pages.
Exhibit 22, as cited in Complaint of Centripetal Networks, Inc. dated Apr. 19, 2022, Infringement Chart for U.S. Pat. No. 10,193,917, 29 pages.
Exhibit 23, as cited in Complaint of Centripetal Networks, Inc. dated Apr. 19, 2022, Infringement Chart for U.S. Pat. No. 10,284,526, 27 pages.
Exhibit 24, as cited in Complaint of Centripetal Networks, Inc. dated Apr. 19, 2022, IPWatchdog.com Article: Centripetal Networks Awarded $1.9 Billion in Infringement Suit Against Cisco, dated Oct. 9, 2020, 6 pages.
Exhibit 25, as cited in Complaint of Centripetal Networks, Inc. dated Apr. 19, 2022, SC Media Article: Judge Denies Cisco New Trial, Upholds Judgment in Patent Infringement Suit, dated Mar. 29, 2021, 4 pages.
Sourcefire 3D System User Guide, Version 4.10, Mar. 16, 2011, 2123 pages.
Statement RE: Related Application, dated Jul. 24, 2015.
Tarsa et al., "Balancing Trie-Based Policy representations for Network Firewalls," Department of Computer Science, Wake Forest University, pp. 1-6 (2006).
J. Ellermann et al., "Firewalls for ATM Networks", Proceedings of INFOSEC'COM, 1998.
V. Srinivasan et al., "Fast and Scalable Layer Four Switching", Proceedings of ACM SIGCOMM, 191-202, 1998.
V.P. Ranganath, "A Set-Based Approach to Packet Classification", Proceedings of the IASTED International Conference on Parallel and Distributed Computing and Systems, 889-894, 2003.
W.E. Leland et al., "On the Self-Similar Nature of Ethernet Traffic", IEEE Transactions on Networking, 2(1); 15, 1994.
W.E. Smith, "Various Optimizers for Single-Stage Productions", Naval Research Logistics Quarterly, 3: 59-66, 1956.
X. Gan et al., "LSMAC vs. LSNAT: Scalable Cluster-based Web servers", Journal of Networks, Software Tools, and Applications, 3(3): 175-185, 2000.
Ylonen, et al., "The Secure Shell (SSH) Transport Layer Protocol," SSH Communication Security Corp, Newtork Working Group RFC 4253, Jan. 2006, 32 pages.
Aug. 16, 2019 (EP) Extended Search Report—App. 19170936.9.
Sep. 18, 2018 (US) Petition for Inter Partes Review of U.S. Pat. No. 9,413,722—IPR 2018-01760.
Sep. 18, 2018 (US) Declaration of Dr. Stuart Staniford in Support of Petition for Inter Partes Review of U.S. Pat. No. 9,413,722—IPR 2018-01760.
Sep. 3, 2019 U.S. Notice of Allowance and Fees Due—U.S. Appl. No. 16/518,190.

(56) References Cited

OTHER PUBLICATIONS

Aug. 19, 2019 (EP) Communication pursuant to Article 94(3) EPC—Examination Report—App. 14719415.3.
Oct. 11, 2019—U.S. Non-Final Office Action—U.S. Appl. No. 16/554,293.
Oct. 10, 2019—U.S. Notice of Allowance—U.S. Appl. No. 16/448,997.
Sep. 30, 2019 (WO) International Search Report and Written Opinion of International Searching Authority—Application No. PCT/US2019/040830.
Exhibit 1022—"Transmission Control Protocol," IETF RFC 793. J. Postel, ed., Sep. 1981.
Exhibit 1023—"Internet Protocol," IETF RFC 791, J. Postel, ed., Sep. 1981.
Exhibit 1024—"File Transfer Protocol," IETF RFC 765, J. Postel, ed., Jun. 1980.
May 20, 2019 (US) Decision—Institution of Inter Partes Review of U.S. Pat. No. 9,413,722 B1—IPR 2018-01760.
Aug. 20, 2019 (US) Declaration of Dr. Alessandro Orso in Support of Patent Owner's Response of U.S. Pat. No. 9,413,722—IPR 2018-01760.
Feb. 21, 2019 (US) Patent Owner's Preliminary Response of U.S. Pat. No. 9,413,722—IPR 2018-01760.
Aug. 20, 2019 (US) Patent Owner's Response of U.S. Pat. No. 9,413,722—IPR 2018-01760.
Jan. 15, 2020 (US) Patent Owner's Sur-Reply to Petitioner's Reply—IPR 2018-01760.
Jan. 8, 2020 (US) Deposition of Jacob H. Baugher, III—IPR 2018-01760.
"Cisco Cyber Threat Defense Solution 1.1 How-To Guide: NetFlow Security Event Logging Guide"; 2013 Cisco, pp. 1-8.
Attachment 1 in German Nullity Action for EP32575202 dated Apr. 29, 2020.
Attachment 2 in German Nullity Action in EP32575202 dated Apr. 29, 2020.
Attachment 3 in German Nullity Action in EP32575202 dated Apr. 29, 2020.
Attachment 4 in German Nullity Action in EP32575202 dated May 29, 2012.
Attachment 5 in German Nullity Action in EP32575202 date unknown.
Attachment 6 in German Nullity Action in EP32575202 dated Oct. 23, 2020.
Attachment 7 in German Nullity Action in EP 32575202 dated Nov. 26, 2020.
Part 1 Attachment in German Nullity Action in EP32575202 dated Dec. 23, 2020.
Part 2 Attachment in German Nullity Action in EP32575202 dated Nov. 26, 2020.
Part 3 Attachment in German Nullity Action in EP32575202 date unknown.
Exhibit 1002 in IPR2021-01150—Part 1 of File History of U.S. Pat. No. 10,530,903, issued Jan. 7, 2020.
Exhibit 1002 in IPR2021-01150—Part 2 of File History of U.S. Pat. No. 10,530,903, issued Jan. 7, 2020.
Exhibit 1002 in IPR2021-01150—Part 3 of File History of U.S. Pat. No. 10,530,903, issued Jan. 7, 2020.
Exhibit 1002 in IPR2021-01150—Part 4 of File History of U.S. Pat. No. 10,530,903, issued Jan. 7, 2020.
Exhibit 1003 in IPR2021-01150—Declaration of Dr. Robert Akl, D.Sc., U.S. Pat. No. 10,530,903, executed Jul. 20, 2021, 176 pages.
Exhibit 1017 in IPR2021-01150 and IPR2021-01151—Petition for Inter Partes Review Under 35 U.S.C. §312 and 37 C. F.R. §42.104, U.S. Pat. No. 9,560, 176, executed Sep. 17, 2018, 78 pages.
Exhibit 1018 in IPR2021-01150 and IPR2021-01151—Petition for Inter Partes Review Under 35 U.S.C. §312 and 37 C.F.R. §42.104, U.S. Pat. No. 9,560, 176, executed Sep. 17, 2018, 86 pages.
Exhibit 1019 in IPR2021-01150 and IPR2021-01151—Jul. 14, 2021 Email re: PAN scheduling and disvoery proposals, 9 pages.

Exhibit 1020 in IPR2021-01150 and IPR2021-01151—Amended Complaint for Patent Infringement, Case: 2:21-cv-00137-RCY-RJK, Document 65, filed Jul. 9, 2021, 167 pages.
Exhibit 1022 in IPR2021-01150 and RFC2021-01151—RFC: 793, Transmission Control Protocol, DARPA Internet Program, Protocol Specification, Sep. 1981, 91 pages.
Exhibit 1023 in IPR2021-01150 and IPR2021-01151—Golnabi, et al., "Analysis of Firewall Policy Rules Using Data Mining Techniques," 2006 IEEE, pp. 305-315.
Exhibit 1024 in IPR2021-01150 and IPR2021-01151—Dantu, et al., "Dynamic Control of Worm Propagation," Proceedings of the International Conference on Information Technology: Coding and Computing (ITCC'04), 2004 IEEE, 5 pages.
Exhibit 26, as cited in Complaint of Centripetal Networks, Inc. dated Apr. 19, 2022, Keysight Network Visibility Products Catalog, dated Nov. 3, 2021, 19 pages.
Exhibit 27 as cited in Complaint of Centripetal Networks, Inc. dated Apr. 19, 2022, Keysight Webpage: Vision ONE, dated Jan. 9, 2022, 11 pages.
Exhibit 28, as cited in Complaint of Centripetal Networks, Inc. dated Apr. 19, 2022, Keysight Webpage: Network Packet Brokers, dated Dec. 31, 2021, 5 pages.
Exhibit 29, as cited in Complaint of Centripetal Networks, Inc. dated Apr. 19, 2022, Keysight Data Sheet: CloudLens Self-Hosted, dated Aug. 21, 2020, 20 pages.
Exhibit 30, as cited in Complaint of Centripetal Networks, Inc. dated Apr. 19, 2022, Keysight Webpage: NetStack, dated Dec. 31, 2021, 6 pages.
Exhibit 31, as cited in Complaint of Centripetal Networks, Inc. dated Apr. 19, 2022, Keysight Webpage: SecureStack, dated Dec. 31, 2021, 6 pages.
Exhibit 32, as cited in Complaint of Centripetal Networks, Inc. dated Apr. 19, 2022, Keysight Webpage: AppStack, dated Dec. 31, 2021, 6 pages.
Exhibit 33, as cited in Complaint of Centripetal Networks, Inc. dated Apr. 19, 2022, Keysight Webpage: AppStack, dated Dec. 31, 2021, 6 pages.
Exhibit 34, as cited in Complaint of Centripetal Networks, Inc. dated Apr. 19, 2022, Keysight Webpage: MobileStack, dated Dec. 31, 2021, 7 pages.
Exhibit 35, as cited in Complaint of Centripetal Networks, Inc. dated Apr. 19, 2022, Keysight Data Sheet: ThreatARMOR, dated Apr. 28, 2021, 6 pages.
Exhibit 36, as cited in Complaint of Centripetal Networks, Inc. dated Apr. 19, 2022, Keysight Solution Brief: Threat Simulator: Proving You're Safter Than You Were Yesterday, dated Nov. 25, 2020, 5 pages.
Exhibit 37, as cited in Complaint of Centripetal Networks, Inc. dated Apr. 19, 2022, Keysight Webpage: Network Security Tools, dated Dec. 31, 2021, 6 pages.
Exhibit 38, as cited in Complaint of Centripetal Networks, Inc. dated Apr. 19, 2022, Keysight Webpage: Application and Threat Intelligence (Subscription), dated Dec. 31, 2021, 7 pages.
Exhibit 39, as cited in Complaint of Centripetal Networks, Inc. dated Apr. 19, 2022, Keysight Webpage: ThreatArmor: Threat Intelligence Gateway, dated Dec. 31, 2021, 9 pages.
Exhibit 41, as cited in Complaint of Centripetal Networks, Inc. dated Apr. 19, 2022, Keysight Webpage: CloudLens, dated Jan. 25, 2022, 9 pages.
Exhibit 42, as cited in Complaint of Centripetal Networks, Inc. dated Apr. 19, 2022, Keysight Data Sheet: Vision X Network Packet Broker, dated Oct. 13, 2021, 13 pages.
Exhibit 43, as cited in Complaint of Centripetal Networks, Inc. dated Apr. 19, 2022, Keysight Webpage: Vision One, dated Feb. 3, 2022, 7 pages.
Exhibit 44, as cited in Complaint of Centripetal Networks, Inc. dated Apr. 19, 2022, Keysight Webpage: Vision X Network Packet Broker, dated Feb. 3, 2022, 8 pages.
Exhibit 45, as cited in Complaint of Centripetal Networks, Inc. dated Apr. 19, 2022, Keysight Investor Day 2020 Presentation, dated Mar. 3, 2020, 172 pages.
Exhibit 46, as cited in Complaint of Centripetal Networks, Inc. dated Apr. 19, 2022, Keysight Press Release: Keysight Technolo-

(56) References Cited

OTHER PUBLICATIONS gies' Corporate Headquarters Operational After Northern California Fires, dated Nov. 6, 2017, 3 pages.
Exhibit 47, as cited in Complaint of Centripetal Networks, Inc. dated Apr. 19, 2022, Keysight/Ixia Vision One Product Label, 2 pages.
Exhibit 49, as cited in Complaint of Centripetal Networks, Inc. dated Apr. 19, 2022, Keysight Webpage: Support, dated Jan. 25, 2022, 3 pages.
Exhibit 50, as cited in Complaint of Centripetal Networks, Inc. dated Apr. 19, 2022, Keysight Webpage: Keysight Support, dated Jan. 25, 2022, 4 pages.
Exhibit 51, as cited in Complaint of Centripetal Networks, Inc. dated Apr. 19, 2022, Ixia Webpage: Support, dated Jan. 25, 2022, 11 pages.
Exhibit 52, as cited in Complaint of Centripetal Networks, Inc. dated Apr. 19, 2022, Keysight White Paper: Advanced Security Intelligence with Rap Sheet Analytics, dated Nov. 10, 2021, 9 pages.
Exhibit 53, as cited in Complaint of Centripetal Networks, Inc. dated Apr. 19, 2022, Ixia Case Study: Financial Investment Firm Reduces Risk, 6 pages.
Exhibit 54, as cited in Complaint of Centripetal Networks, Inc. dated Apr. 19, 2022, Keysight Press Release: Keysight's New Security Operations Platform Enables Organizatioins to Measure and Improve Effectiveness of Operational Security, dated Feb. 6, 2022, 7 pages.
Exhibit 55, as cited in Complaint of Centripetal Networks, Inc. dated Apr. 19, 2022, Keysight Form 10-K Annual Report for the fiscal year ended Oct. 31, 2021, 161 pages.
Exhibit 56, as cited in Complaint of Centripetal Networks, Inc. dated Apr. 19, 2022, Keysight Webpage: TradeVision, dated Jan. 25, 2022, 11 pages.
Exhibit 57, as cited in Complaint of Centripetal Networks, Inc. dated Apr. 19, 2022, Keysight Webpage: Network Security Tools, dated Jan. 25, 2022, 6 pages.
Exhibit 58, as cited in Complaint of Centripetal Networks, Inc. dated Apr. 19, 2022, Keysight Webpage: Sales Request. dated Feb. 4, 2022, 6 pages.
Exhibit 59, as cited in Complaint of Centripetal Networks, Inc. dated Apr. 19, 2022, CDW.com Webpage: Ixia Vision ONE with Fixed 48 Part SFP+ Security Appliance, dated Feb. 4, 2022, 4 pages.
Exhibit 60, as cited in Complaint of Centripetal Networks, Inc. dated Apr. 19, 2022, Insight.com Webpage: Ixia Vision ONE Sys-Va-48PX-AC Security Appliance, dated 2022, 5 pages.
Exhibit 61, as cited in Complaint of Centripetal Networks, Inc. dated Apr. 19, 2022, Shi.com Webpage: Ixia ThreatARMOR 1G Security Appliance, dated Feb. 4, 2022, 4 pages.
Exhibit 62, as cited in Complaint of Centripetal Networks, Inc. dated Apr. 19, 2022, Deltatechsol.com Webpage: Ixia ThreatARMOR-1G—ThreatArmor 1GBE Security Appliance with 4 1GB SFP Ports, Requires Active ATI, dated Feb. 4, 2022, 5 pages.
Exhibit 63, as cited in Complaint of Centripetal Networks, Inc. dated Apr. 19, 2022, Caegis Solutions Ebay Invoice: Ixia Vision ONE Security Appliance 48-Ports + 48 SFP-10G SR 2x PSU, dated Dec. 16, 2021, 2 pages.
Exhibit 67, as cited in Complaint of Centripetal Networks, Inc. dated Apr. 19, 2022, Ixia Press Release: Ixia Leverages the Cloud to Streamline Network Threat Intelligence, dated Nov. 9, 2016, 5 pages.
Exhibit 68, as cited in Complaint of Centripetal Networks, Inc. dated Apr. 19, 2022, Ixia White Paper: Application and Threat Intelligence Research Center, dated 2019, 5 pages.
Exhibit 69, as cited in Complaint of Centripetal Networks, Inc. dated Apr. 19, 2022, Ixia Feature Brief: SecureStack—Optimized Handling of Secure Traffic, dated 2018, 4 pages.
Exhibit 70, as cited in Complaint of Centripetal Networks, Inc. dated Apr. 19, 2022, Keysight Data Sheet: Vision ONE Security Without Sacrifice, dated Jul. 23, 2021, 13 pages.

Exhibit 71, as cited in Complaint of Centripetal Networks, Inc. dated Apr. 19, 2022, Ixia Technical Overview: Ixia's Inline Security Architecture, dated Jan. 7, 2020, 35 pages.
Exhibit 72, as cited in Complaint of Centripetal Networks, Inc. dated Apr. 19, 2022, Keysight White Paper: Inspecting SSL Traffic: Achieving the Right Balance of Visibility and Security, dated May 22, 2020, 9 pages.
Exhibit 73, as cited in Complaint of Centripetal Networks, Inc. dated Apr. 19, 2022, Keysight Solution Brief: Security: In an Encrypted World, dated Feb. 25, 2020, 7 pages.
Exhibit 74, as cited in Complaint of Centripetal Networks, Inc. dated Apr. 19, 2022, Centripetal Service Brief: CleanINTERNET, dated 2018, 3 pages.
Exhibit 75, as cited in Complaint of Centripetal Networks, Inc. dated Apr. 19, 2022, Centripetal Product Brief: CleanINTERNET, dated 2018, 3 pages.
Exhibit 76, as cited in Complaint of Centripetal Networks, Inc. dated Apr. 19, 2022, Centripetal: CleanINTERNET Managed Security Services, dated of publication unknown, 13 pages.
Exhibit 78, as cited in Complaint of Centripetal Networks, Inc. dated Apr. 19, 2022, Centripetal White Paper: Far Beyond The Firewall: Centripetal CleanINTERNET Service, dated 2019, 6 pages.
Exhibit 80, as cited in Complaint of Centripetal Networks, Inc. dated Apr. 19, 2022, Keysight Software Entitlement Certificate, 2 pages.
Exhibit 81, as cited in Complaint of Centripetal Networks, Inc. dated Apr. 19, 2022, Keysight Shipping Point Labels, 2 pages.
Exhibit 82, as cited in Complaint of Centripetal Networks, Inc. dated Apr. 19, 2022, Guidepoint Security, LLC Invoice, dated Feb. 24, 2022, 2 pages.
May 24, 2019 U.S. Non-Final Office Action—U.S. Appl. No. 16/111,524.
A. Feldmann et al., "Tradeoffs for Packet Classification", Proceedings of the IEEE INFOCOM, 397-413, 2000.
A. Hari et al., "Detecting and Resolving Packet Filter Conflicts", Proceedings of IEEE Infocom, 1203-1212, 2000.
Acharya et al., "OPTWALL: A Hierarchical Traffic-Aware Firewall," Department of Computer Science, Telecommunications Program, University of Pittsburgh, pp. 1-11 (2007).
Anonymous: "The Distribution of Malicious Domains," The DomainTools Report, 2016 Edition, Mar. 9, 2016 (Mar. 9, 2016), pp. 1-11, XP055502306, Retrieved from: https://www.domaintools.com/resources/white-papers/the-domaintools-report-the-distribution-of-malicious-domains.
Bellion, "High Performance Packet Classification", http://www.hipac.org (Publication Date Unknown).
Blake, et al., "An Architecture for Differentiated Services," Network Working Group RFC 2475, Dec. 1998, 36 pages.
Blake, et al., "An Architecture for Differentiated Services," also known as the Diffserv architecture, as defined in RFC 2475, Network Working Group, Dec. 1998, 36 pages.
C. Benecke, "A Parallel Packet Screen for High Speed Networks", Proceedings of the 15th Annual Computer Security Applications Conference, 1999.
Chen, et al., "Research on the Anomaly Discovering Algorithm of the Packet Filtering Rule Sets," Sep. 2010, First International Confererence on Pervasive Computing, Signal Processing and Applications, pp. 362-366.
D. Comer, "Analysis of a Heuristic for Full Trie Minimization", ACM Transactions on Database Systems, 6(3): 513-537, Sep. 1981.
D. Decasper et al., "Router Plugins: A Software Architecture for Next-Generation Routers", IEEE/ACM Transactions on Networking, 8(1): Feb. 2000.
D. Eppstein et al., "Internet Packet Filter Management and Rectangle Geometry", Proceedings of the Symposium on Discrete Algorithms, 827-835, 2001.
E. Al-Shaer et al., "Firewall Policy Advisor for Anomaly Discovery and Rule Editing", Proceedings of the IFIP/IEEE International Symposium on Integrated Network Management, 2003.
E. Al-Shaer et al., "Modeling and Management of Firewall Policies", IEEE Transactions on Network and Service Management, 1(1): 2004.

(56) References Cited

OTHER PUBLICATIONS

E. Fulp et al., "Network Firewall Policy Tries", Technical Report, Computer Science Department, Wake Forest University, 2004.
E. Fulp, "Optimization of Network Firewall Policies Using Ordered Sets and Directed Acyclical Graphs", Technical Report, Computer Scient Department, Wake Forest University, Jan. 2004.
E. Fulp, "Preventing Denial of Service Attacks on Quality of Service", Proceedings of the 2001 DARPA Information Survivability Conference and Exposition II, 2001.
E.L. Lawler, "Sequencing Jobs to Minimize Total Weighted Completion Time Subject to Precedence Constraints", Annals of Discrete Mathematics, 2: 75-90, 1978.
E.W. Fulp, "Firewall Architectures for High Speed Networks", U.S. Department of Energy Grant Application, Funded Sep. 2003.
Frahim, et al., "Cisco ASA: All-in-One Firewall, IPS, and VPN Adaptive Security Appliance," Indiana: Cisco Press: 2006, 54 pages.
Fulp, "Trie-Based Policy Representations for Network Firewalls," Proceedings of the IEEE International Symposium on Computer Communications (2005).
Fulp, Errin: "CV: Errin Fulp," XP002618346, www.cs.wfu.edu/fulp/ewfPub.html, pp. 1-5 (Copyright 2010).
G. Brightwell et al., "Counting Linear Extensions is #P-Complete", Proceedings of the Twenty-Third Annual ACM Symposium on Theory of Computing, 1991.
G.V. Rooij, "Real Stateful TCP Packet Filtering in IP Filter", Proceedings of the 10th USENIX Security Symposium, 2001.
Greenwald, Michael; "Designing an Academic Firewall: Policy, Practice, and Experience with SURF"; IEEE, Proceedings of SNDSS, 1996.
J. Xu et al., "Design and Evaluation of a High-Performance ATM Firewall Switch and Its Applications", IEEE Journal on Selected Areas in Communications, 17(6): 1190-1200, Jun. 1999.
J.K. Lenstra et al., "Complexity of Scheduling Under Precedence Constraints", Operations Research, 26(1): 22-35, 1978.
Kindervag, et al. "Build Security Into Your Network's DNA: The Zero Trust Network Architecture," Forrester Research Inc.; Nov. 5, 2010, pp. 1-26.
L. Qui et al., "Fast Firewall Implementations for Software and Hardware-Based Routers", Proceedings of ACM Sigmetrics, Jun. 2001.
Lee et al., "Development Framework for Firewall Processors," IEEE, pp. 352-355 (2002).
M. Al-Suwaiyel et al., "Algorithms for Trie Compaction", ACM Transactions on Database Systems, 9(2): 243-263, Jun. 1984.
M. Christiansen et al., "Using IDDs for Packet Filtering," Technical Report, BRICS, Oct. 2002.
M. Degermark et al., "Small Forwarding Tables for Fast Routing Lookups", Proceedings of ACM SIGCOMM, 4-13, 1997.
Mizuno et al., A New Remote Configurable Firewall System for Home-use Gateways, Jan. 2005. Second IEEE Consumer Communications and Networking Conference, pp. 599-601.
Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.
Nichols, et al., "Definition of the Differentiated Services Field (DS Field) in the IPV4 and IPV6 Headers," Network Working Group RFC 2474, Dec. 1998, 20 pages.
O. Paul et al., "A full Bandwidth ATM Firewall", Proceedings of the 6th European Symposium on Research in Computer Security ESORICS'2000, 2000.
P. Warkhede et al., "Fast Packet Classification for Two-Dimensional Conflict-Free Filters", Proceedings of IEEE INFOCOM, 1434-1443, 2001.
Palo Alto Networks; "Designing a Zero Trust Network With Next-Generation Firewalls"; pp. 1-10; last viewed on Oct. 21, 2012.
Perkins, "IP Encapsulation with IP," Network Working Group RFC 2003, Oct. 1996, 14 pages.
R. Funke et al., "Performance Evaluation of Firewalls in Gigabit-Networks", Proceedings of the Symposium on Performance Evaluation of Computer and Telecommunication Systems, 1999.
R. Rivest, "On Self-Organizing Sequential Search Heuristics", Communications of the ACM, 19(2): 1976.
R.L. Graham et al., "Optimization and Approximation in Deterministic Sequencing and Scheduling: A Survey", Annals of Discrete Mathematics, 5: 287-326, 1979.
Reddy, A.L.(2012) A.L. Narasimha Reddy Curriculum Vitae. Retrieved from https://cesg.tamu.edu/wp-content/uploads/2012/02/res_ext032.pdf, 16 pages.
Reumann, John; "Adaptive Packet Filters"; IEEE, 2001, Department of Electrical Engineering and Computer Science, The University of Michigan, Ann Arbor, MI.
S,M. Bellovin et al., "Network Firewalls", IEEE Communications Magazine, 50-57, 1994.
S. Goddard et al., "An Unavailability Analysis of Firewall Sandwich Configurations", Proceedings of the 6th IEEE Symposium on High Assurance Systems Engineering, 2001.
S. Suri et al., "Packet Filtering in High Speed Networks", Proceedings of the Symposium on Discrete Algorithms, 969-970, 1999.
Singh, Rajeev et al. "Detecting and Reducing the Denial of Service attacks in WLANs", Dec. 2011, World Congress on Information and Communication TEchnologies, pp. 968-973.
Apr. 15, 2016—U.S. Notice of Allowance—U.S. Appl. No. 14/855,374.
Apr. 26, 2016—U.S. Office Action—U.S. Appl. No. 14/745,207.
Dec. 5, 2016—U.S. Notice of Allowance—U.S. Appl. No. 14/714,207.
Feb. 24, 2016—(AU) Office Action—App 2014228257.
Feb. 25, 2016—(AU) Office Action—App 2014249055.
Feb. 26, 2016—U.S. Non Final Office Action—U.S. Appl. No. 14/253,992.
Jan. 11, 2016—U.S. Non Final Rejection—U.S. Appl. No. 14/698,560.
Jan. 28, 2016—(WO) International Search Report and Written Opinion—App PCT/US2015/062691.
Jul. 11, 2016—(EP) Office Action—App 14720824.3.
Jul. 20, 2016—(AU) Office Action—App 2013335255.
Jul. 22, 2016—U.S. Office Action—U.S. Appl. No. 14/921,718.
Jun. 9, 2016—(WO) International Search Report—PCT/US2016/026339.
Jun. 14, 2016—U.S. Office Action—U.S. Appl. No. 14/625,486.
Jun. 16, 2016—(CA) Office Action—App 2,888,935.
May 6, 2016—U.S. Office Action—U.S. Appl. No. 14/714,207.
May 13, 2016—U.S. Office Action—U.S. Appl. No. 13/940,240.
Nov. 21, 2016—U.S. Office Action—U.S. Appl. No. 14/745,207.
Oct. 5, 2016—U.S. Notice of Allowance—U.S. Appl. No. 14/698,560.
Oct. 26, 2016—U.S. Office Action—U.S. Appl. No. 13/940,240.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Apr. 12, 2017—U.S. Office Action—U.S. Appl. No. 14/757,638.
Aug. 15, 2017 (WO) International Preliminary Report on Patentability—App. PCT/US2015/062691.
Aug. 21, 2017 (AU) First Examination Report—App. 2015248067.
Feb. 10, 2017—U.S. Notice of Allowance—U.S. Appl. No. 14/625,486.
Feb. 15, 2017—U.S. Notice of Allowance—U.S. Appl. No. 14/921,718.
Jul. 20, 2017 (US) Complaint for Patent Infringement—Case No. 2:17-cv-00383-HCN-LRL, Document 1, 38 pages.
Jun. 7, 2017—U.S. Office Action—U.S. Appl. No. 14/745,207.
Jun. 7, 2017—(WO) International Search Report and Written Opinion—App PCT/US2016/067111.
Mar. 6, 2017—(WO) International Search Report and Written Opinion—App PCT/US2016/068008.
Nov. 21, 2017 U.S. Notice of Allowance—U.S. Appl. No. 14/690,302.
Nov. 3, 2017 U.S. Non-Final Office Action—U.S. Appl. No. 15/413,834.
Oct. 17, 2017 (WO) International Preliminary Report on Patentability—App. PCT/US2016/026339.
Sep. 5, 2017 U.S. Defendant Ixia's Partial Answer to Complaint for Patent Infringement—Case No. 2:17-cv-00383-HCN-LRL, Document 29, 14 pages.
Sep. 5, 2017 (US) Memorandum in Support of Defendant's Ixia and Keysight Technologies, Inc's Motion to Dismiss for Unpatentability Under 35 U.S.C. § 101—Case No. 2:17-cv-00383-HCM-LRL, Document 21, 29 pages.

(56) References Cited

OTHER PUBLICATIONS

Sep. 5, 2017 (US) Request for Judicial Notice in Support of Defendants Ixia and Keysight Technologies, Inc's Motion to Dismiss for Unpatentability under 35 U.S.C. § 101—Case No. 2:17-cv-00383-HCN-LRL, Document 22, 3 pages.
Sep. 29, 2017 (CA) Examination Report—App. 2,772,630.
Apr. 17, 2018 U.S. Non-Final Office Action—U.S. Appl. No. 15/610,995.
Aug. 3, 2018 (US) Declaration of Kevin Jeffay, PhD in Support of Third Petition for Inter Partes Review of U.S. Pat. No. 9,137,205—IPR2018-01505.
Aug. 3, 2018 (US) Declaration of Kevin Jeffay, PhD in Support of Third Petition for Inter Partes Review of U.S. Pat. No. 9,560,077—IPR2018-01513.
Aug. 3, 2018 (US) Third Petition for Inter Partes Review of U.S. Pat. No. 9,137,205—IPR2018-01505.
Aug. 10, 2018 (US) Declaration of Kevin Jeffay, PhD in Support of Fourth Petition for Inter Partes Review of U.S. Pat. No. 9,137,205—IPR2018-01506.
Aug. 10, 2018 (US) Fourth Petition for Inter Partes Review of U.S. Pat. No. 9,137,205—IPR2018-01506.
Aug. 10, 2018 (US) Petition for Inter Partes Review of Claims 1-20 of U.S. Pat. No. 9,560,077—IPR2018-01513.
Aug. 15, 2018 (US) Declaration of Kevin Jeffay, PhD in Support of Petition for Inter Partes Review of U.S. Pat. No. 9,565,213—IPR2018-01512.
Aug. 15, 2018 (US) Declaration of Staurt Staniford, PhD in Support of Petition for Inter Partes Review of U.S. Pat. No. 9,686,193—IPR2018-01556.
Aug. 2, 2018 U.S. Notice of Allowance and Fees Due—U.S. Appl. No. 16/030,254.
Aug. 20, 2018 (US) Petition for Inter Partes Review of U.S. Pat. No. 9,565,213—IPR2018-01512.
Aug. 21, 2018 (US) Petition for Inter Partes Review of U.S. Pat. No. 9,686,193—IPR2018-01559.
Aug. 8, 2023, Initial Determination on Violation of Section 337 and Recommended Determination on Remedy and Bond, Inv. No. 337-TA-1314, 285 pages.
Oct. 11, 2023 (US) Memorandum Opinion and Order, Civil Action No. 2:21-CV-00137 (EWH), Document 452, 32 pages.
Aug. 8, 2023, Notice: Issuance of Initial Determination on Violation of Section 337 with Recommendation on Remedy, Inv. No. 337-TA-1314, 2 pages.
Dec. 5, 2023 (US) Notice of Commission Determination to Review in Part and, On Review, To Affirm a Final Initial Determination Finding No Violation of Section 337; Termination of the Investigation, Investigation No. 337-TA-1314, 4 pages.
Jan. 2, 2024—(US) Memorandum Opinion and Order, Civil Action No. 2:21-CV-00137 (EH), 24 pages.

\* cited by examiner

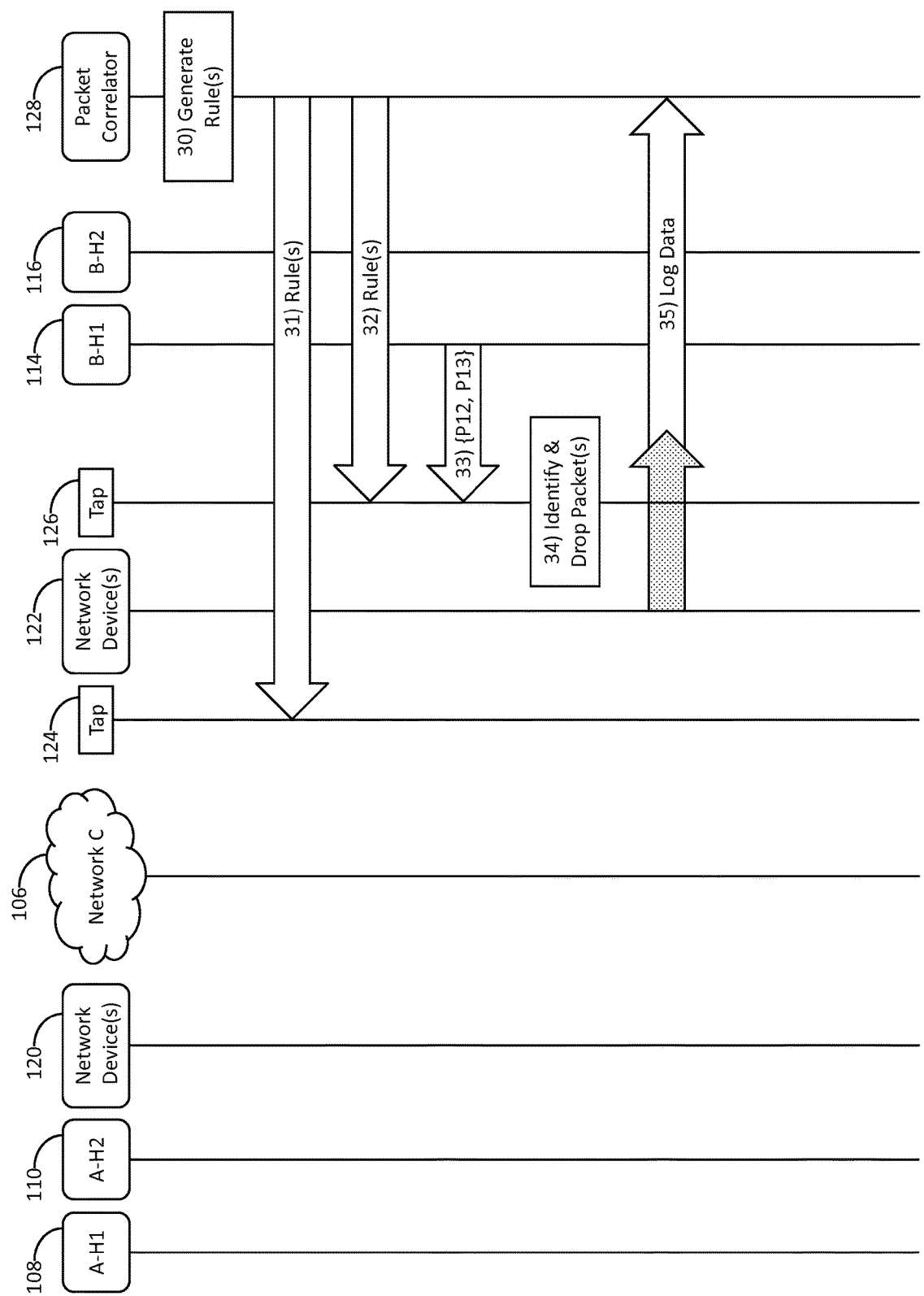

FIG. 3

| Tap 124 (Tx) | | | Tap 126 (Rx) | | |
|---|---|---|---|---|---|
| Time | Net., Trans., App. Layer Info. | Env. Variable(s) | Time | Net., Trans., App. Layer Info. | Env. Variable(s) |
| T4 | <Net., Trans., App. Layer Info.> | <Env. Variable(s)> | T1 | <Net., Trans., App. Layer Info.> | <Env. Variable(s)> |
| T5 | <Net., Trans., App. Layer Info.> | <Env. Variable(s)> | T2 | <Net., Trans., App. Layer Info.> | <Env. Variable(s)> |
| T6 | <Net., Trans., App. Layer Info.> | <Env. Variable(s)> | T3 | <Net., Trans., App. Layer Info.> | <Env. Variable(s)> |
| T10 | <Net., Trans., App. Layer Info.> | <Env. Variable(s)> | T7 | <Net., Trans., App. Layer Info.> | <Env. Variable(s)> |
| T11 | <Net., Trans., App. Layer Info.> | <Env. Variable(s)> | T8 | <Net., Trans., App. Layer Info.> | <Env. Variable(s)> |
| T12 | <Net., Trans., App. Layer Info.> | <Env. Variable(s)> | T9 | <Net., Trans., App. Layer Info.> | <Env. Variable(s)> |
| T15 | <Net., Trans., App. Layer Info.> |  | T13 | <Net., Trans., App. Layer Info.> | <Env. Variable(s)> |
| T16 | <Net., Trans., App. Layer Info.> |  | T14 | <Net., Trans., App. Layer Info.> | <Env. Variable(s)> |
|  |  |  | T17 | <Net., Trans., App. Layer Info.> <DROPPED> | <Env. Variable(s)> |
|  |  |  | T18 | <Net., Trans., App. Layer Info.> <DROPPED> | <Env. Variable(s)> |

…

CORRELATING PACKETS IN COMMUNICATIONS NETWORKS

CROSS-REFERENCE TO RELATED APPLICATIONS

This application is a continuation of U.S. patent application Ser. No. 17/177,572, filed Feb. 17, 2021, entitled CORRELATING PACKETS IN COMMUNICATIONS NETWORKS, which is a continuation of co-pending U.S. application Ser. No. 16/854,094, filed Apr. 21, 2020, entitled "CORRELATING PACKETS IN COMMUNICATIONS NETWORKS," which is a continuation of co-pending U.S. patent application Ser. No. 16/554,293, filed Aug. 28, 2019, entitled "CORRELATING PACKETS IN COMMUNICATIONS NETWORKS," which is a continuation of co-pending U.S. patent application Ser. No. 15/413,947 (now U.S. Pat. No. 10,530,903), filed Jan. 24, 2017, entitled "CORRELATING PACKETS IN COMMUNICATIONS NETWORKS," which is a continuation of U.S. patent application Ser. No. 14/714,207 (now U.S. Pat. No. 9,560,176), filed May 15, 2015, entitled "CORRELATING PACKETS IN COMMUNICATIONS NETWORKS," which is a continuation of U.S. patent application Ser. No. 14/618,967 (now U.S. Pat. No. 9,264,370), filed Feb. 10, 2015, entitled "CORRELATING PACKETS IN COMMUNICATIONS NETWORKS." The disclosures of both applications are incorporated by reference herein in their entirety and made part hereof.

BACKGROUND

Communications between endpoints of packet-switched networks may be characterized as flows of associated packets. A particular flow may include packets containing information (e.g., within headers of the packets) that distinguishes the packets from packets associated with other flows. Network devices located between endpoints may alter packets associated with a flow and in doing so may potentially obfuscate the flow with which a particular packet is associated from other network devices. Accordingly, there is a need for correlating packets in communications networks.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Aspects of this disclosure relate to correlating packets in communications networks. In accordance with embodiments of the disclosure, a computing system may identify packets received by a network device from a host located in a first network and may generate log entries corresponding to the packets received by the network device. The computing system may identify packets transmitted by the network device to a host located in a second network and may generate log entries corresponding to the packets transmitted by the network device. Utilizing the log entries corresponding to the packets received by the network device and the log entries corresponding to the packets transmitted by the network device, the computing system may correlate the packets transmitted by the network device with the packets received by the network device.

In some embodiments, the packets received by the network device may be associated with one or more flows (e.g., distinct end-to-end communication sessions); however, the network device may alter the packets in a way that obscures their association with the flow(s) from the computing system. Correlating the packets transmitted by the network device with the packets received by the network device may enable the computing system to determine that the packets transmitted by the network device are associated with the flow(s).

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIGS. 2A, 2B, 2C, and 2D depict an illustrative event sequence for correlating packets in communications networks in accordance with one or more aspects of the disclosure;

FIG. 3 depicts illustrative log entries for correlating packets in communications networks in accordance with one or more aspects of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure.

Various connections between elements are discussed in the following description. These connections are general and, unless specified otherwise, may be direct or indirect, wired or wireless. In this respect, the specification is not intended to be limiting.

Figure 1:
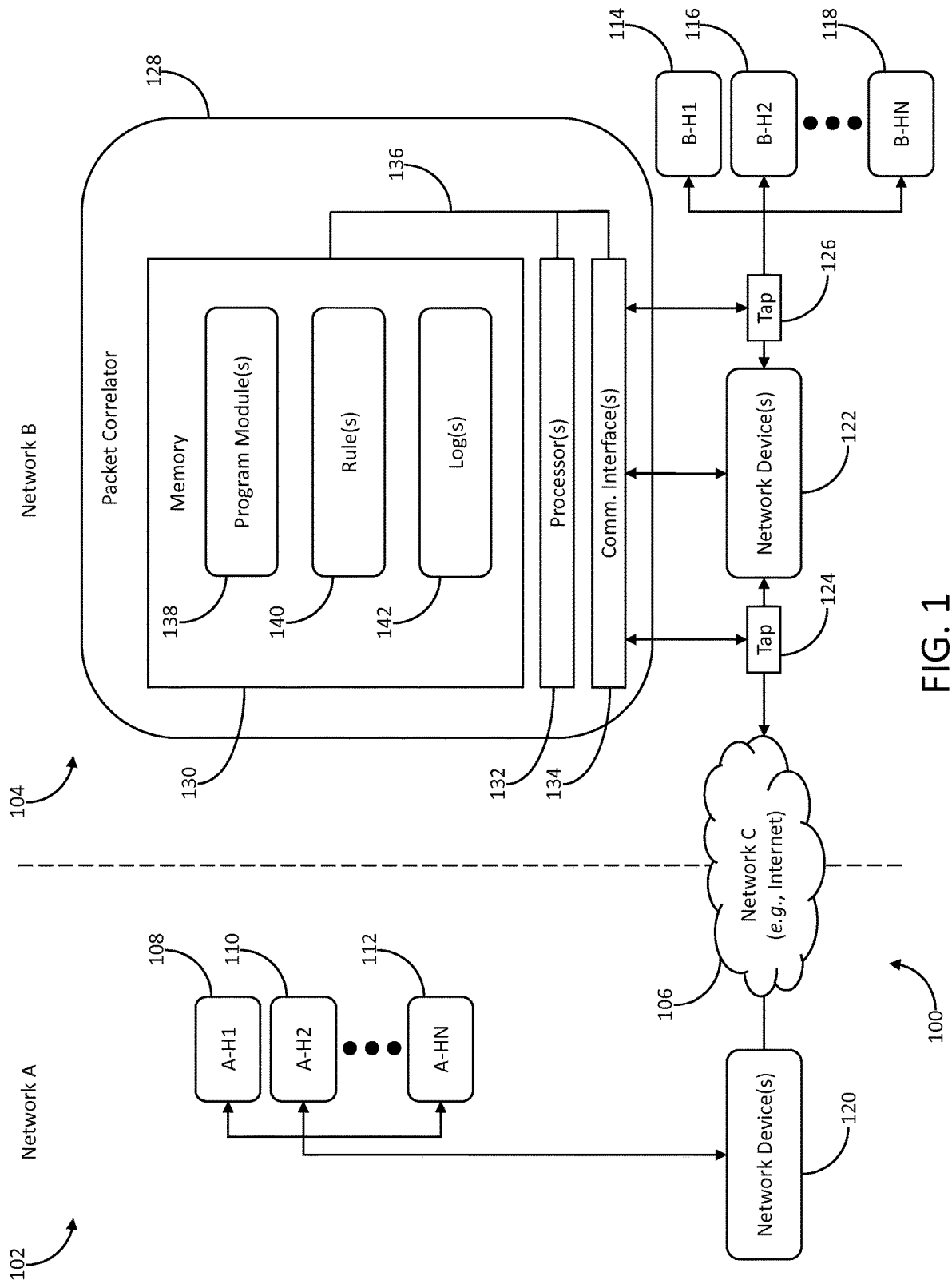
FIG. 1 depicts an illustrative environment for correlating packets in communications networks in accordance with one or more aspects of the disclosure.

FIG. 1 depicts an illustrative environment for correlating packets in communications networks in accordance with one or more aspects of the disclosure. Referring to FIG. 1, environment 100 may include networks 102, 104, and 106. Networks 102 and 104 may comprise one or more networks (e.g., Local Area Networks (LANs), Wide Area Networks (WANs), Virtual Private Networks (VPNs), or combinations thereof) associated with one or more individuals or entities (e.g., governments, corporations, service providers, or other organizations). Network 106 may comprise one or more networks (e.g., LANs, WANs, VPNs, or combinations thereof) that interface networks 102 and 104. For example, network 106 may be the Internet, a similar network, or portions thereof. Networks 102 and 104 may include one or more hosts. For example, network 102 may include hosts 108, 110, and 112. Similarly, network 104 may include hosts 114, 116, and 118. Hosts 108, 110, 112, 114, 116, and 118 may be one or more computing or network devices (e.g., servers, desktop computers, laptop computers, tablet computers, mobile devices, smartphones, routers, gateways, switches, access points, or the like), or a communication interface thereof. Networks 102 and 104 may include one or more network devices. For example, network 102 may include network device(s) 120, and network 104 may include network device(s) 122. Network device(s) 120 may include one or more devices (e.g., servers, routers, gateways, switches, access points, or the like) that interface hosts 108, 110, and 112 with network 106. Similarly, network device(s) 122 may include one or more devices that interface hosts 114, 116, and 118 with network 106.

Network 104 may include tap devices 124 and 126 and packet correlator 128. Tap device 124 may be located on or have access to a communication path that interfaces network device(s) 122 and network 106. Tap device 126 may be located on or have access to a communication path that interfaces network device(s) 122 and network 104 (e.g., one or more of hosts 114, 116, and 118). Packet correlator 128 may comprise one or more devices and may include memory 130, processor(s) 132, communication interface(s) 134, and data bus 136. Data bus 136 may interface memory 130, processor(s) 132, and communication interface(s) 134. Communication interface(s) 134 may interface packet correlator 128 with network device(s) 122 and tap devices 124 and 126. Memory 130 may comprise program module(s) 138, rule(s) 140, and log(s) 142. Program module(s) 138 may comprise instructions that when executed by processor(s) 132 cause packet correlator 128, tap device 124, or tap device 126 to perform one or more of the functions described herein. Rule(s) 140 may be generated by packet correlator 128 and may be configured to cause tap device(s) 124 and 126 to identify packets meeting criteria specified by rule(s) 140 and to perform one or more functions specified by rule(s) 140 on the identified packets (e.g., forward (or route) the packets toward their respective destinations, drop the packets, log information associated with or contained in the packets, copy the packets (or data contained therein), or the like). For example, tap devices 124 and 126 may comprise one or more packet-filtering devices and may be provisioned with rule(s) 140, which may configure tap device(s) 124 and 126 to identify packets meeting criteria specified by rule(s) 140 and to communicate data associated with the identified packets to packet correlator 128 (e.g., via communication interface(s) 134), which may utilize the data to generate one or more log entries corresponding to the identified packets in log(s) 142.

Figure 2A:
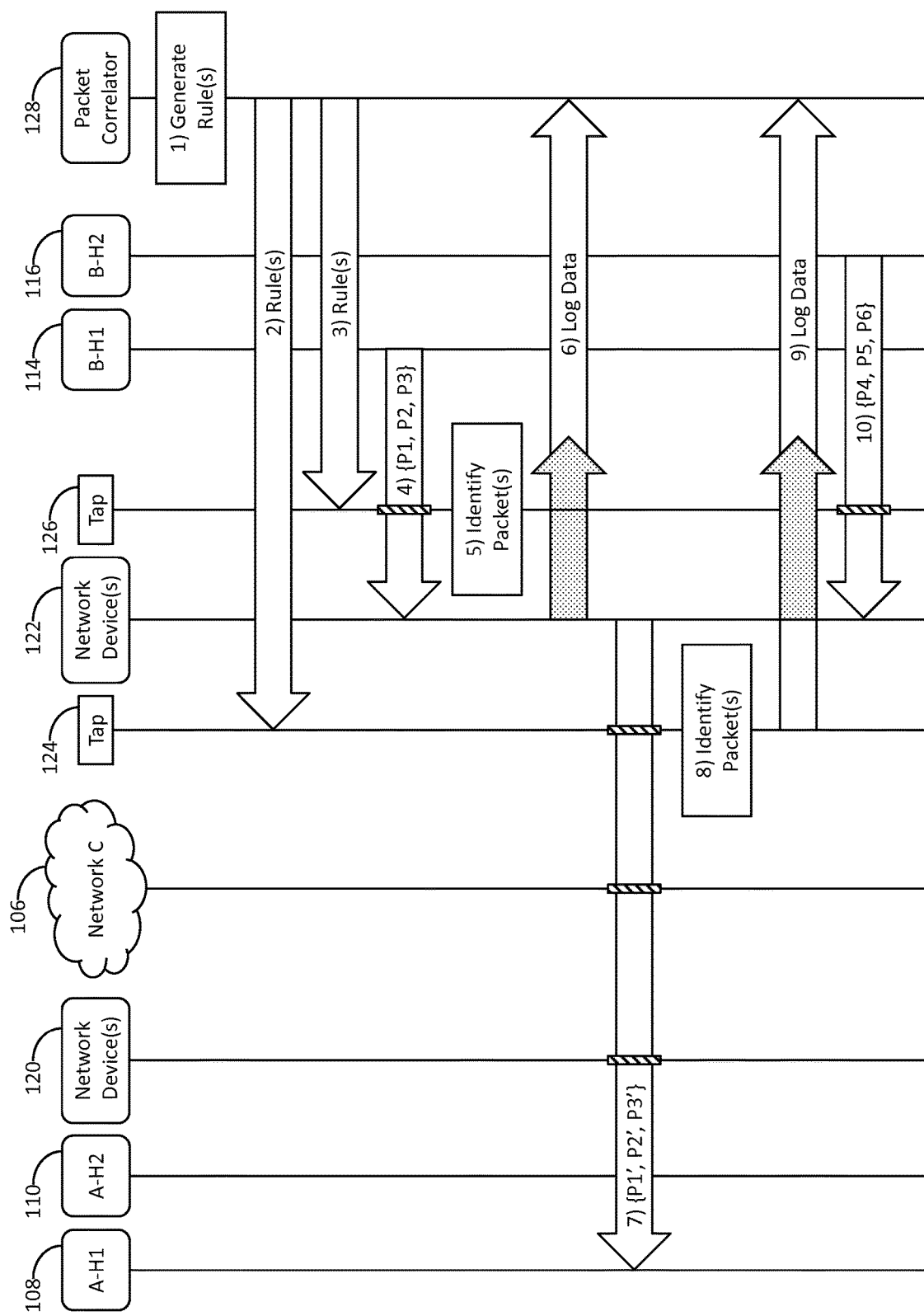

FIGS. 2A, 2B, 2C, and 2D depict an illustrative event sequence for correlating packets in communications networks in accordance with one or more aspects of the disclosure. Referring to FIG. 2A, at step 1, packet correlator 128 may generate rule(s) 140. As indicated above, rule(s) 140 may comprise criteria and may be configured to cause tap devices 124 and 126 to identify packets meeting the criteria and to perform one or more functions specified by rule(s) 140 on the identified packets. For example, rule(s) 140 may comprise criteria specifying a set of destination network addresses that includes an address associated with host 108 and may be configured to cause tap devices 124 and 126 to identify packets meeting the criteria (e.g., destined for host 108) and to communicate data associated with the identified packets to packet correlator 128. At step 2, packet correlator 128 may provision tap device 124 with rule(s) 140. At step 3, packet correlator 128 may provision tap device 126 with rule(s) 140.

At step 4, host 114 may generate packets (e.g., P1, P2, and P3) destined for host 108 and may communicate the packets to network device(s) 122. As indicated by the shaded box overlaying the communication of the packets and the line extending downward from tap device 126, the packets may be routed through tap device 126, or tap device 126 may have access to a communication path that interfaces network device(s) 122 and host 114 (e.g., tap device 126 may receive copies of or information associated with or contained in packets traversing the communication path that interfaces network device(s) 122 and host 114). At step 5, tap device 126 may identify the packets (e.g., P1, P2, and P3) by determining that the packets are destined for the network address associated with host 108 (e.g., based on network-layer information contained in their headers) and determining that the network address associated with host 108 is in the set of destination network addresses specified by the criteria included in rule(s) 140. At step 6, tap device 126 may generate log data associated with the packets received by network device(s) 122 from host 114 (e.g., P1, P2, and P3) and may communicate the log data to packet correlator 128. As indicated by the shaded communication emanating from network device(s) 122, the log data may include data from network device(s) 122, which may be requested (e.g., by tap device 126) and communicated via communication interface(s) 134.

Packet correlator 128 may receive the log data and may utilize the log data to generate one or more entries corresponding to the packets in log(s) 142. For example, referring to FIG. 3, log(s) 142 may include log(s) 302 (e.g., for entries associated with packets transmitted by network device(s) 122) and log(s) 304 (e.g., for entries associated with packets received by network device(s) 122), and, responsive to receiving the log data from tap device 126, packet correlator 128 may utilize the log data to generate entries 306, 308, and 310 (e.g., corresponding to P1, P2, and P3, respectively). Each of entries 306, 308, and 310 may include data associated with their respective corresponding packet, including, for example, network-layer information (e.g., information derived from one or more network-layer header fields of the packet, such as a protocol type, a destination network address, a source network address, a signature or authentication information (e.g., information from an Internet Protocol Security (IPsec) Encapsulating Security Payload (ESP)), or the like), transport-layer information (e.g., a destination port, a source port, a checksum or similar data (e.g., error detection or correction values, such as those utilized by the transmission control protocol (TCP) and the user datagram protocol (UDP)), or the like), application-layer information (e.g., information derived from one or more application-layer header fields of the packet, such as a domain name, a uniform resource locator (URL), a uniform resource identifier (URI), an extension, a method, state information, media-type information, a signature, a key, a timestamp, an application identifier, a session identifier, a flow identifier, sequence information, authentication information, or the like), other data in the packet (e.g., data in a payload of the packet), or one or more environmental variables (e.g., information associated with but not solely derived from the packet itself, such as an arrival time (e.g., at network device(s) 122 or tap device 126), an ingress or egress identifier of network device(s) 122 (e.g., an identifier associated with a physical or logical network interface or port of network device(s) 122 via which the packet was received), a communication-media type of network device(s) 122, an identifier associated with tap device 126, or the like). For example, entries 306, 308, and 310 may include data indicating that P1, P2, and P3 were received from host 114 and destined for host 108 (e.g., data derived from network- or application-layer header fields of P1, P2, and P3).

Packet correlator 128 may generate timestamps for each of entries 306, 308, and 310. For example, packet correlator 128 may generate a timestamp for entry 306 indicating a time (e.g., T1) corresponding to receipt of P1 by network device(s) 122 (e.g., a time corresponding to when network device(s) 122 received P1, a time corresponding to when tap device 126 identified P1, a time corresponding to generation of entry 306, or the like). Similarly, packet correlator 128 may generate a timestamp for entry 308 indicating a time (e.g., T2) corresponding to receipt of P2 by network device(s) 122 and generate a timestamp for entry 310 indicating a time (e.g., T3) corresponding to receipt of P3 by network device(s) 122.

Returning to FIG. 2A, at step 7, network device(s) 122 may generate one or more packets (e.g., P1', P2', and P3') corresponding to the packets received from host 114 and may communicate (or transmit) (e.g., via network 106 and network device(s) 120) the corresponding packets (or data contained therein) to host 108. The packets received by network device(s) 122 from host 114 (e.g., P1, P2, and P3) may be associated with one or more flows (e.g., distinct end-to-end communication sessions between host 114 and host 108), and the corresponding packets generated by network device(s) 122 and communicated to host 108 (e.g., P1', P2', and P3') may thus also be associated with the flow(s). Network device(s) 122, however, may include one or more devices that alter one or more aspects of the packets (e.g., a flow-transforming device) in a way that obfuscates the association of the packets received from host 114 (e.g., P1, P2, and P3) with the corresponding packets generated by network device(s) 122 (e.g., P1', P2', and P3'), at least from the perspective of devices other than network device(s) 122.

For example, in some embodiments, network device(s) 122 may be configured to perform network address translation (NAT) for network addresses associated with network 104 (e.g., network addresses associated with hosts 114, 116, and 118). In such embodiments, the packets received from host 114 (e.g., P1, P2, and P3) may comprise network- or transport-layer header information identifying their source as a network address associated with host 114 (e.g., a network address associated with network 104 (or a private network address)), and the corresponding packets generated by network device(s) 122 (e.g., P1', P2', and P3') may comprise network- or transport-layer header information identifying their source as a network address associated with network device(s) 122 (e.g., a network address associated with network 106 (or a public network address)).

Additionally or alternatively, network device(s) 122 may comprise a proxy (e.g., a web proxy, a domain name system (DNS) proxy, a session initiation protocol (SIP) proxy, or the like) configured to receive requests and generate corresponding requests. For example, the packets received by network device(s) 122 from host 114 (e.g., P1, P2, and P3) may comprise requests for data from host 108 configured to cause host 108 to transmit the requested data to host 114, and the corresponding packets generated by network device(s) 122 (e.g., P1', P2', and P3') may comprise corresponding requests for the data from host 108 configured to cause host 108 to transmit the requested data to network device(s) 122.

In some embodiments, network device(s) 122 may comprise a gateway (e.g., a bridge, intermediary, VPN, or tunneling gateway). For example, the packets received from host 114 (e.g., P1, P2, and P3) may comprise data destined for host 108, and the corresponding packets generated by network device(s) 122 (e.g., P1', P2', and P3') may comprise packets that encapsulate, encrypt, or otherwise transform the packets received from host 114 (e.g., P1, P2, and P3) (or the data destined for host 108 included therein). For example, network device(s) 122 may comprise a tunneling gateway, and network device(s) 120 may comprise a paired tunneling gateway configured to decapsulate, decrypt, or otherwise inverse transform P1', P2', and P3' (or data included therein) to produce, reproduce, or replicate P1, P2, and P3 (or the data destined for host 108 included therein). In such embodiments, there may not be a one-to-one correspondence between the packets received by network device(s) 122 and the corresponding packets generated by network device(s) 122. For example, data associated with the encapsulation may cause network device(s) 122 to generate more corresponding packets (e.g., due to one or more protocol size constraints).

While such obfuscation may be done without malice, it may also be performed with malicious intent. For example, network device(s) 122 may be employed by a malicious entity to attempt to obfuscate, spoof, or proxy for the identity or location of host 114 (e.g., network device(s) 122 may be employed as part of a man-in-the-middle attack).

At step 8, tap device 124 may identify the corresponding packets generated by network device(s) 122 (e.g., P1', P2', and P3') by determining that the packets meet the criteria included in rule(s) 140. The criteria may include any combination of the network-layer information, transport-layer information, application-layer information, or environmental variable(s), as described above with respect to FIG. 3. For example, tap device 124 may identify the corresponding packets generated by network device(s) 122 (e.g., P1', P2', and P3') by determining that the corresponding packets are destined for the network address associated with host 108 (e.g., based on network-layer information contained in their headers) and determining that the network address associated with host 108 is in the set of destination network addresses specified by the criteria included in rule(s) 140. At step 9, tap device 124 may generate log data associated with the corresponding packets generated by network device(s) 122 (e.g., P1', P2', and P3') and may communicate the log data to packet correlator 128. As indicated by the shaded communication emanating from network device(s) 122, the log data may include data from network device(s) 122, which may be requested (e.g., by tap device 124) and communicated via communication interface(s) 134.

Packet correlator 128 may receive the log data and may utilize the log data to generate one or more entries corresponding to the packets in log(s) 142. For example, responsive to receiving the log data from tap device 124, packet correlator 128 may utilize the log data to generate entries 312, 314, and 316 (e.g., corresponding to P1', P2', and P3', respectively) in log(s) 302. Each of entries 312, 314, and 316 may include data associated with their respective corresponding packet (e.g., network-layer information, transport-layer information, application-layer information, or environmental variable(s)). For example, entries 312, 314, and 316 may include data indicating that P1', P2', and P3' were destined for host 108 (e.g., data derived from application-layer header fields of P1', P2', and P3').

Packet correlator 128 may generate timestamps for each of entries 312, 314, and 316. For example, packet correlator 128 may generate a timestamp for entry 312 indicating a time (e.g., T4) corresponding to transmission of P1' by network device(s) 122 (e.g., a time corresponding to when network device(s) 122 transmitted P1', a time corresponding to when tap device 124 identified P1', a time corresponding to generation of entry 312, or the like). Similarly, packet correlator 128 may generate a timestamp for entry 314 indicating a time (e.g., T5) corresponding to transmission of P2' by network device(s) 122 and generate a timestamp for entry 316 indicating a time (e.g., T6) corresponding to transmission of P3' by network device(s) 122.

Figure 2B:
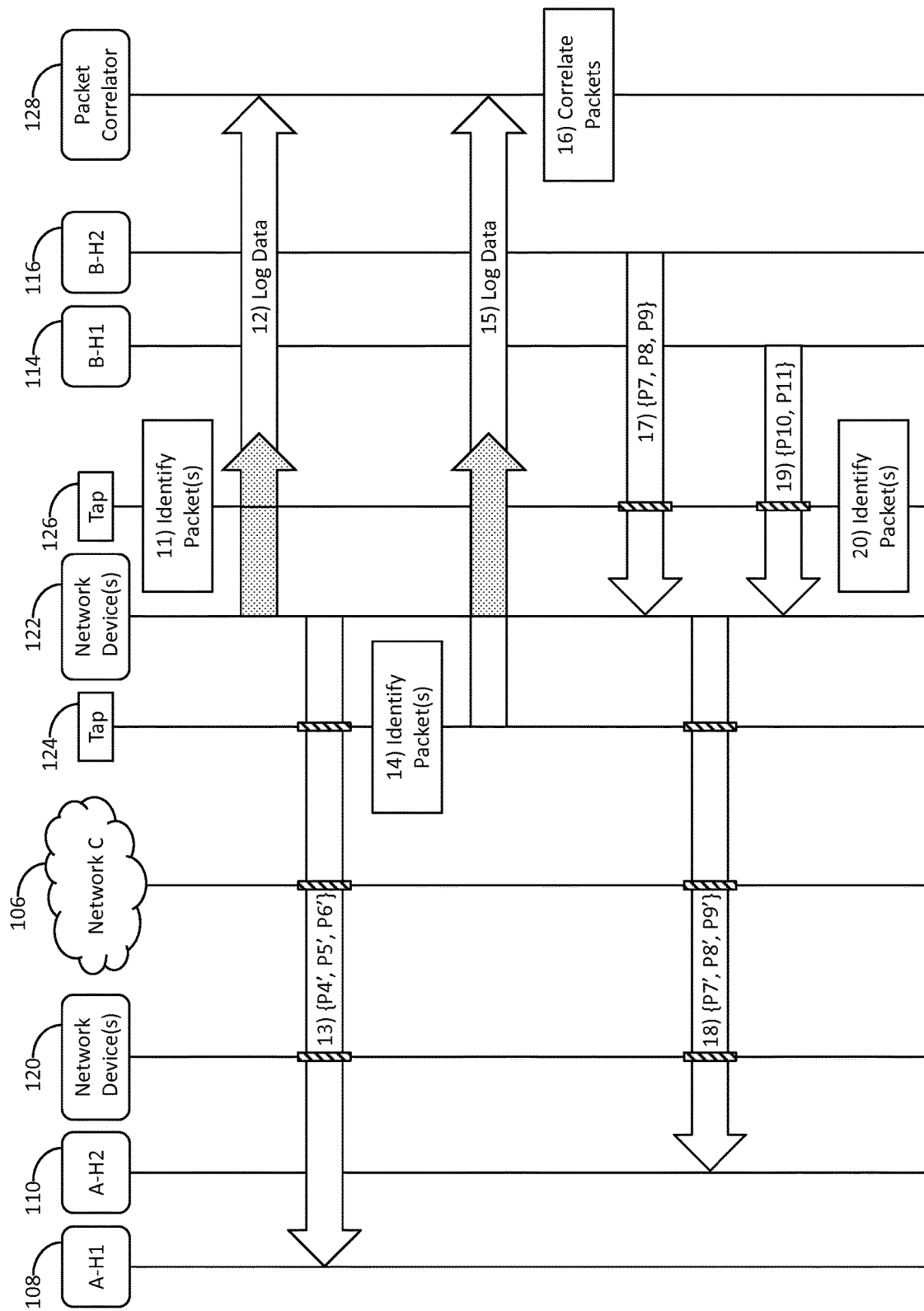

At step 10, host 116 may generate packets (e.g., P4, P5, and P6) destined for host 108 and may communicate the packets to network device(s) 122. Referring to FIG. 2B, at step 11, tap device 126 may identify the packets (e.g., P4, P5, and P6) by determining that the packets are destined for the network address associated with host 108 (e.g., based on network-layer information contained in their headers) and determining that the network address associated with host 108 is in the set of destination network addresses specified by the criteria included in rule(s) 140. At step 12, tap device 126 may generate log data associated with the packets received by network device(s) 122 from host 116 (e.g., P4, P5, and P6) and may communicate the log data to packet correlator 128.

Packet correlator 128 may receive the log data and may utilize the log data to generate one or more entries corresponding to the packets in log(s) 142. For example, responsive to receiving the log data from tap device 126, packet correlator 128 may utilize the log data to generate entries 318, 320, and 322 (e.g., corresponding to P4, P5, and P6, respectively) in log(s) 304. Each of entries 318, 320, and 322 may include data associated with their respective corresponding packet (e.g., network-layer information, transport-layer information, application-layer information, or environmental variable(s)). For example, entries 318, 320, and 322 may include data indicating that P4, P5, and P6 were received from host 116 and destined for host 108 (e.g., data derived from application-layer header fields of P4, P5, and P6).

Packet correlator 128 may generate timestamps for each of entries 318, 320, and 322. For example, packet correlator 128 may generate a timestamp for entry 318 indicating a time (e.g., T7) corresponding to receipt of P4 by network device(s) 122 (e.g., a time corresponding to when network device(s) 122 received P4, a time corresponding to when tap device 126 identified P4, a time corresponding to generation of entry 318, or the like). Similarly, packet correlator 128 may generate a timestamp for entry 320 indicating a time (e.g., T8) corresponding to receipt of P5 by network device(s) 122 and generate a timestamp for entry 322 indicating a time (e.g., T9) corresponding to receipt of P6 by network device(s) 122.

At step 13, network device(s) 122 may generate one or more packets (e.g., P4', P5', and P6') corresponding to the packets received from host 116 and may communicate (or transmit) (e.g., via network 106 and network device(s) 120) the corresponding packets (or data contained therein) to host 108. The packets received by network device(s) 122 from host 116 (e.g., P4, P5, and P6) may be associated with one or more flows (e.g., distinct end-to-end communication sessions between host 116 and host 108), and the corresponding packets generated by network device(s) 122 and communicated to host 108 (e.g., P4', P5', and P6') may thus also be associated with the flow(s). As indicated above, however, network device(s) 122 may include one or more devices that alter one or more aspects of the packets (e.g., a device configured to perform NAT for network addresses associated with network 104, a proxy, a gateway (e.g., a VPN or tunneling gateway), or one or more other flow-transforming devices) in a way that obfuscates the association of the packets received from host 116 (e.g., P4, P5, and P6) with the corresponding packets generated by network device(s) 122 (e.g., P4', P5', and P6'), at least from the perspective of devices other than network device(s) 122.

For example, as indicated above, network device(s) 122 may be configured to perform NAT for network addresses associated with network 104. The packets received from host 116 (e.g., P4, P5, and P6) may comprise network- or transport-layer header information identifying their source as a network address associated with host 116 (e.g., a network address associated with network 104 (or a private network address)), and the corresponding packets generated by network device(s) 122 (e.g., P4', P5', and P6') may comprise network- or transport-layer header information identifying their source as a network address associated with network device(s) 122 (e.g., a network address associated with network 106 (or a public network address)).

At step 14, tap device 124 may identify the corresponding packets generated by network device(s) 122 (e.g., P4', P5', and P6') by determining that the packets meet the criteria included in rule(s) 140. For example, tap device 124 may identify the corresponding packets generated by network device(s) 122 (e.g., P4', P5', and P6') by determining that the corresponding packets are destined for the network address associated with host 108 (e.g., based on network- or transport-layer information contained in their headers) and determining that the network address associated with host 108 is in the set of destination network addresses specified by the criteria included in rule(s) 140. At step 15, tap device 124 may generate log data associated with the corresponding packets generated by network device(s) 122 (e.g., P4', P5', and P6') and may communicate the log data to packet correlator 128.

Packet correlator 128 may receive the log data and may utilize the log data to generate one or more entries corresponding to the packets in log(s) 142. For example, responsive to receiving the log data from tap device 124, packet correlator 128 may utilize the log data to generate entries 324, 326, and 328 (e.g., corresponding to P4', P5', and P6', respectively) in log(s) 302. Each of entries 324, 326, and 328 may include data associated with their respective corresponding packet (e.g., network-layer information, transport-layer information, application-layer information, or environmental variable(s)). For example, entries 324, 326, and 328 may include data indicating that P4', P5', and P6' were destined for host 108 (e.g., data derived from application-layer header fields of P4', P5', and P6').

Packet correlator 128 may generate timestamps for each of entries 324, 326, and 328. For example, packet correlator 128 may generate a timestamp for entry 324 indicating a time (e.g., T10) corresponding to transmission of P4' by network device(s) 122 (e.g., a time corresponding to when network device(s) 122 transmitted P4', a time corresponding to when tap device 124 identified P4', a time corresponding to generation of entry 324, or the like). Similarly, packet correlator 128 may generate a timestamp for entry 326 indicating a time (e.g., T11) corresponding to transmission of P5' by network device(s) 122 and generate a timestamp for entry 328 indicating a time (e.g., T12) corresponding to transmission of P6' by network device(s) 122.

At step 16, packet correlator 128 may utilize log(s) 142 to correlate the packets transmitted by network device(s) 122 with the packets received by network device(s) 122. For example, packet correlator 128 may compare data in entry 306 with data in entry 312 (e.g., network-layer information, transport-layer information, application-layer information, or environmental variable(s)) to correlate P1' with P1 (e.g., by determining that a portion of the data in entry 306 corresponds with data in entry 312). Similarly, packet correlator 128 may compare data in entry 308 with data in entry 314 to correlate P2' with P2, packet correlator 128 may compare data in entry 310 with data in entry 316 to correlate P3' with P3, packet correlator 128 may compare data in entry 318 with data in entry 324 to correlate P4' with P4, packet correlator 128 may compare data in entry 320 with data in entry 326 to correlate P5' with P5, and packet correlator 128 may compare data in entry 322 with data in entry 328 to correlate P6' with P6.

In some embodiments, packet correlator 128 may compare data in one or more entries of log(s) 142 with data in one or more other entries of log(s) 142 to determine correlation scores for each of multiple possible correlations. For example, for each entry in log(s) 302 (or a portion thereof (e.g., a portion of the entries comprising data matching one or more criteria)), packet correlator 128 may compare data in the entry with data in each of the entries in log(s) 304 (or a portion thereof (e.g., a portion of the entries comprising data matching the one or more criteria)) to determine correlation scores corresponding to multiple possible correlations (e.g., based on the amount (e.g., percentage) of information in the data that corresponds) and may select the correlation corresponding to the correlation score indicating the strongest correlation (e.g., indicating the greatest amount of corresponding information in the data of the entries). For example, for entry 312, packet correlator 128 may compare the data in entry 312 (e.g., network-layer information, transport-layer information, application-layer information, or environmental variable(s)) (or a portion thereof) with the data in entries 306, 308, and 310 (or corresponding portions thereof), may determine that the amount (e.g., percentage) of data in entry 312 that corresponds to data in entry 306 is greater than the amount of data in entry 312 that corresponds to data in entry 308 and the amount of data in entry 312 that corresponds to data in entry 310, and, based on such a determination, may correlate P1' with P1.

In some embodiments, packet correlator 128 may correlate the packets transmitted by network device(s) 122 with the packets received by network device(s) 122 by comparing one or more timestamps of the entries in log(s) 142 with one or more other timestamps of the entries in log(s) 142. For example, for each entry in log(s) 302 (or a portion thereof (e.g., a portion of the entries comprising data matching one or more criteria)), packet correlator 128 may compare the timestamp of the entry with the timestamps of the entries in log(s) 304 (or a portion thereof (e.g., a portion of the entries comprising data matching the one or more criteria)) to determine a difference between the times indicated by the timestamps and may correlate the packet corresponding to the entry in log(s) 302 with a packet corresponding to an entry in log(s) 304 having the smallest difference in time indicated by the timestamps. For example, for entry 312, packet correlator 128 may compute a difference between T4 and T1, T2, and T3, may determine that |T4−T1|<|T4−T2|<|T4−T3|, and, based on such a determination, may correlate P1' with P1.

At step 17, host 116 may generate packets (e.g., P7, P8, and P9) destined for host 110 and may communicate the packets to network device(s) 122. Tap device 126 may determine that the packets (e.g., P7, P8, and P9) are destined for a network address associated with host 110 (e.g., based on network-layer information contained in their headers), may determine that the network address associated with host 110 is not in the set of destination network addresses specified by the criteria included in rule(s) 140, and, based on these determinations, may fail to generate log data associated with the packets received by network device(s) 122 from host 116 (e.g., P7, P8, and P9). At step 18, network device(s) 122 may generate one or more packets (e.g., P7', P8', and P9') corresponding to the packets received from host 116 and may communicate (or transmit) (e.g., via network 106 and network device(s) 120) the corresponding packets (or data contained therein) to host 110. Tap device 124 may determine that the corresponding packets (e.g., P7', P8', and P9') are destined for the network address associated with host 110 (e.g., based on network-layer information contained in their headers), may determine that the network address associated with host 110 is not in the set of destination network addresses specified by the criteria included in rule(s) 140, and, based on these determinations, may fail to generate log data associated with the packets generated by network device(s) 122 (e.g., P7', P8', and P9'). For example, packet correlator 128 may be configured to correlate packets destined for the network address associated with host 108 but not packets destined for the network address associated with host 110, and rule(s) 140 may be configured to cause tap devices 124 and 126 to generate log data for packets destined for the network address associated with host 108 but not for packets destined for the network address associated with host 110 (e.g., host 108 may be associated with a malicious entity or host 110 may be associated with a trusted entity).

Figure 2C:
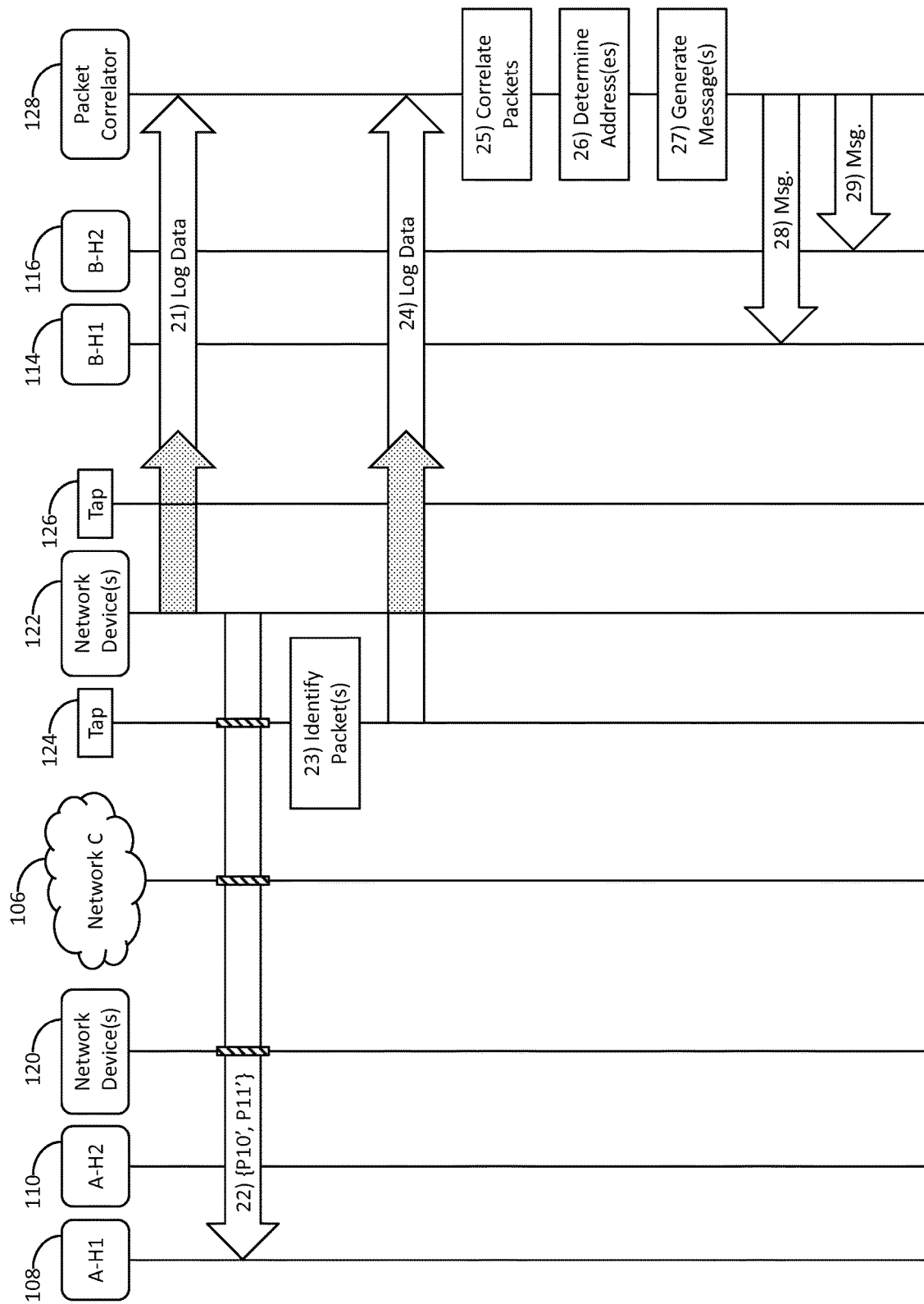

At step 19, host 114 may generate packets (e.g., P10 and P11) destined for host 108 and may communicate the packets to network device(s) 122. At step 20, tap device 126 may identify the packets (e.g., P10 and P11) by determining that the packets are destined for the network address associated with host 108 (e.g., based on network-layer information contained in their headers) and determining that the network address associated with host 108 is in the set of destination network addresses specified by the criteria included in rule(s) 140. Referring to FIG. 2C, at step 21, tap device 126 may generate log data associated with the packets received by network device(s) 122 from host 114 (e.g., P10 and P11) and may communicate the log data to packet correlator 128.

Packet correlator 128 may receive the log data and may utilize the log data to generate one or more entries corresponding to the packets in log(s) 142. For example, responsive to receiving the log data from tap device 126, packet correlator 128 may utilize the log data to generate entries 330 and 332 (e.g., corresponding to P10 and P11, respectively) in log(s) 304. Each of entries 330 and 332 may include data associated with their respective corresponding packet (e.g., network-layer information, transport-layer information, application-layer information, or environmental variable(s)). For example, entries 330 and 332 may include data indicating that P10 and P11 were received from host 114 and destined for host 108 (e.g., data derived from application-layer header fields of P10 and P11).

Packet correlator 128 may generate timestamps for each of entries 330 and 332. For example, packet correlator 128 may generate a timestamp for entry 330 indicating a time (e.g., T13) corresponding to receipt of P10 by network device(s) 122 (e.g., a time corresponding to when network device(s) 122 received P10, a time corresponding to when tap device 126 identified P10, a time corresponding to generation of entry 330, or the like). Similarly, packet correlator 128 may generate a timestamp for entry 332 indicating a time (e.g., T14) corresponding to receipt of P11 by network device(s) 122.

At step 22, network device(s) 122 may generate one or more packets (e.g., P10' and P11') corresponding to the packets received from host 114 and may communicate (or transmit) (e.g., via network 106 and network device(s) 120) the corresponding packets (or data contained therein) to host 108. The packets received by network device(s) 122 from host 114 (e.g., P10 and P11) may be associated with one or more flows (e.g., distinct end-to-end communication sessions between host 114 and host 108), and the corresponding packets generated by network device(s) 122 and communicated to host 108 (e.g., P10' and P11') may thus also be associated with the flow(s). As indicated above, however, network device(s) 122 may include one or more devices that alter one or more aspects of the packets (e.g., a device configured to perform NAT for network addresses associated with network 104, a proxy, a gateway (e.g., a VPN or tunneling gateway), or one or more other flow-transforming devices) in a way that obfuscates the association of the packets received from host 114 (e.g., P10 and P11) with the corresponding packets generated by network device(s) 122 (e.g., P10' and P11'), at least from the perspective of devices other than network device(s) 122.

For example, as indicated above, network device(s) 122 may be configured to perform NAT for network addresses associated with network 104. The packets received from host 114 (e.g., P10 and P11) may comprise network-layer header information identifying their source as a network address associated with host 114 (e.g., a network address associated with network 104 (or a private network address)), and the corresponding packets generated by network device(s) 122 (e.g., P10' and P11') may comprise network-layer header information identifying their source as a network address associated with network device(s) 122 (e.g., a network address associated with network 106 (or a public network address)).

At step 23, tap device 124 may identify the corresponding packets generated by network device(s) 122 (e.g., P10' and P11') by determining that the packets meet the criteria included in rule(s) 140. For example, tap device 124 may identify the corresponding packets generated by network device(s) 122 (e.g., P10' and P11') by determining that the corresponding packets are destined for the network address associated with host 108 (e.g., based on network-layer information contained in their headers) and determining that the network address associated with host 108 is in the set of destination network addresses specified by the criteria included in rule(s) 140. At step 24, tap device 124 may generate log data associated with the corresponding packets generated by network device(s) 122 (e.g., P10' and P11') and may communicate the log data to packet correlator 128.

Packet correlator 128 may receive the log data and may utilize the log data to generate one or more entries corresponding to the packets in log(s) 142. For example, responsive to receiving the log data from tap device 124, packet correlator 128 may utilize the log data to generate entries 334 and 336 (e.g., corresponding to P10' and P11', respectively) in log(s) 302. Each of entries 334 and 336 may include data associated with their respective corresponding packet (e.g., network-layer information, transport-layer information, application-layer information, or environmental variable(s)). For example, entries 334 and 336 may include data indicating that P10' and P11' were destined for host 108 (e.g., data derived from application-layer header fields of P10' and P11').

Packet correlator 128 may generate timestamps for each of entries 334 and 336. For example, packet correlator 128 may generate a timestamp for entry 334 indicating a time (e.g., T15) corresponding to transmission of P10' by network device(s) 122 (e.g., a time corresponding to when network device(s) 122 transmitted P10', a time corresponding to when tap device 124 identified P10', a time corresponding to generation of entry 334, or the like). Similarly, packet correlator 128 may generate a timestamp for entry 336 indicating a time (e.g., T16) corresponding to transmission of P11' by network device(s) 122.

At step 25, packet correlator 128 may utilize log(s) 142 to correlate the packets transmitted by network device(s) 122 with the packets received by network device(s) 122. For example, packet correlator 128 may compare data in entry 330 with data in entry 334 (e.g., network-layer information, transport-layer information, application-layer information, or environmental variable(s)) to correlate P10' with P10 (e.g., by determining that a portion of the data in entry 330 corresponds with data in entry 334). Similarly, packet correlator 128 may compare data in entry 332 with data in entry 336 to correlate P11' with P11. In some embodiments, packet correlator 128 may compare data from one or more requests included in the packets transmitted by network device(s) 122 with data from one or more requests included in the packets received by network device(s) 122 and may correlate one or more of the packets transmitted by network device(s) 122 with one or more of the packets received by network device(s) 122 by determining that the data from the request(s) included in the packet(s) transmitted by network device(s) 122 corresponds to the data from the request(s) included in the packet(s) received by network device(s) 122 (e.g., where network device(s) 122 include a proxy). Additionally or alternatively, packet correlator 128 may compare data encapsulated in one or more of the packets transmitted by network device(s) 122 with data from one or more of the packets received by network device(s) 122 and may correlate one or more of the packets transmitted by network device(s) 122 with one or more of the packets received by network device(s) 122 by determining that the data encapsulated in the packet(s) transmitted by network device(s) 122 corresponds to the data in the packet(s) received by network device(s) 122 (e.g., where network device(s) 122 include a gateway (e.g., a VPN or tunneling gateway)).

In some embodiments, packet correlator 128 may correlate the packets transmitted by network device(s) 122 with the packets received by network device(s) 122 by comparing one or more timestamps of the entries in log(s) 142 with one or more other timestamps of the entries in log(s) 142. For example, packet correlator 128 may compare the timestamp of an entry in log(s) 302 with the timestamps of one or more entries in log(s) 304 (e.g., a portion of the entries comprising data matching one or more criteria)) to determine a difference between the times indicated by the timestamps and may compare the difference between the times indicated by the timestamps with a threshold latency value associated with network device(s) 122 (e.g., a predetermined value representing the time it takes for a packet to be communicated from tap device 126 to tap device 124, an estimated maximum latency associated with a communication path spanning from tap device 126 to tap device 124 (e.g., a communication path comprising network device(s) 122), or the like). For example, for entry 334, packet correlator 128 may compute a difference between T15 and T13, may determine that 0<T15−T13<THRESHOLD, and, based on such a determination, may correlate P10' with P10. In some embodiments, the threshold latency value may be determined based on one or more previously determined differences between timestamps of entries corresponding to previously correlated packets. For example, the threshold latency value with which the difference between T15 and T13 is compared may have been determined based on the differences between T4 and T1, T5 and T2, or T6 and T3.

Responsive to correlating the packets transmitted by network device(s) 122 with the packets received by network device(s) 122, at step 26, packet correlator 128 may determine, based on one or more of the entries in log(s) 142, a network address associated with a host located in network 104 that is associated with a packet transmitted by network device(s) 122. For example, responsive to correlating P10' with P10, packet correlator 128 may determine, based on data in entry 330 (e.g., network-layer information comprising the network address associated with host 114) that the network address associated with host 114 is associated with P10' (e.g., a communication with host 108). At step 27, packet correlator 128 may generate one or more messages identifying host 114. For example, host 108 may be associated with a malicious entity, packet correlator 128 may determine (e.g., based on network-layer information in entry 334) that P10' was transmitted to host 108, and the message(s) may indicate that host 114 communicated with host 108 (e.g., the malicious entity). At step 28, packet correlator 128 may communicate one or more of the message(s) to host 114 (e.g., to notify a user of host 114 of the communication with the malicious entity), and, at step 29, packet correlator 128 may communicate one or more of the message(s) to host 116, which may be associated with an administrator of network 104 (e.g., to notify the administrator of the communication of host 114 with the malicious entity).

Referring to FIG. 2D, at step 30, packet correlator 128 may generate or update rule(s) 140 (e.g., generate one or more new rules or update one or more existing rules) to configure tap devices 124 and 126 to identify and drop packets received from host 114. At step 31, packet correlator 128 may provision tap device 124 with rule(s) 140, and, at step 32, packet correlator 128 may provision tap device 126 with rule(s) 140. At step 33, host 114 may communicate one or more packets (e.g., P12, which may be destined for host 112, and P13, which may be destined for host 118). At step 34, tap device 126 may identify and drop the packets (e.g., P12 and P13) communicated by host 114 (e.g., based on rule(s) 140 and network-layer information contained in the headers of P12 and P13). For example, one or more of the communications between host 108 and 114 (e.g., P1 and P1', P2 and P2', P3 and P3', P10 and P10', or P11 and P11') may be indicative of malware installed by a computing device associated with host 108 (e.g., the malicious entity) on a computing device associated with host 114, and rule(s) 140 may be configured to prevent the spread of the malware.

At step 35, tap device 126 may generate log data associated with the packets communicated by host 114 (e.g., P12 and P13) and may communicate the log data to packet correlator 128, which may receive the log data and may utilize the log data to generate one or more entries corresponding to the packets in log(s) 142. For example, responsive to receiving the log data from tap device 126, packet correlator 128 may utilize the log data to generate entries 338 and 340 (e.g., corresponding to P12 and P13, respectively) in log(s) 304. Each of entries 338 and 340 may include data associated with their respective corresponding packet (e.g., network-layer information, transport-layer information, application-layer information, or environmental variable(s)). For example, entry 338 may include data indicating that P12 was received from host 114 and destined for host 112 (e.g., data derived from application-layer header fields of P12), and entry 340 may include data indicating that P13 was received from host 114 and destined for host 118 (e.g., data derived from application-layer header fields of P13). Entries 338 and 340 may indicate that tap device 126 dropped their respective corresponding packets. Packet correlator 128 may generate timestamps for each of entries 338 and 340. For example, packet correlator 128 may generate a timestamp for entry 338 indicating a time (e.g., T17) corresponding to when tap device 126 identified P12, generation of entry 338, or the like. Similarly, packet correlator 128 may generate a timestamp for entry 340 indicating a time (e.g., T18) corresponding to when tap device 126 identified P13, generation of entry 340, or the like.

Figure 4:
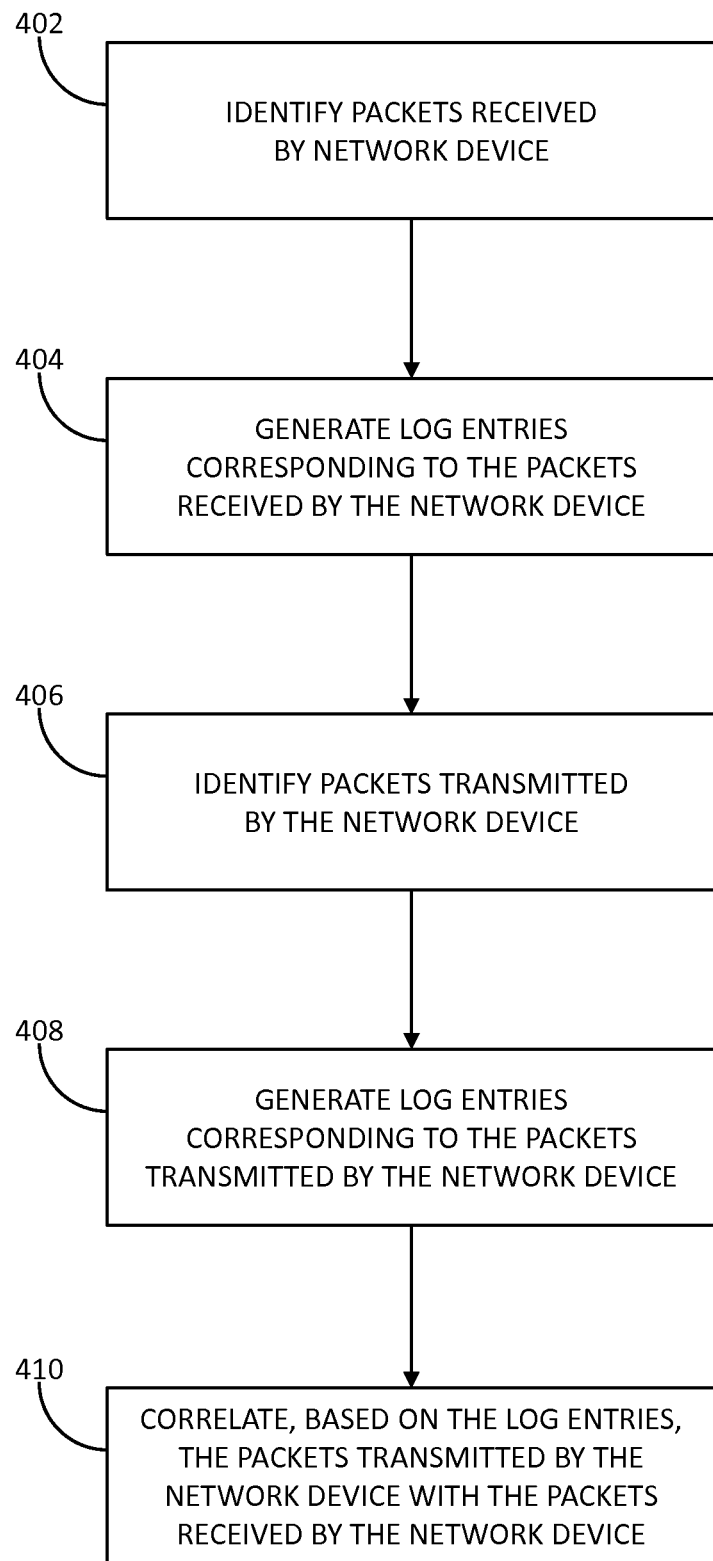
FIG. 4 depicts an illustrative method for correlating packets in communications networks in accordance with one or more aspects of the disclosure.

FIG. 4 depicts an illustrative method for correlating packets in communications networks in accordance with one or more aspects of the disclosure. Referring to FIG. 4, at step 402, a computing system may identify packets received by a network device from a host located in a first network. For example, tap device 126 may identify P1, P2, and P3. At step 404, the computing system may generate log entries corresponding to the packets received by the network device. For example, packet correlator 128 may generate entries 306, 308, and 310. At step 406, the computing system may identify packets transmitted by the network device to a host located in a second network. For example, tap device 124 may identify P1', P2', and P3'. At step 408, the computing system may generate log entries corresponding to the packets transmitted by the network device. For example, packet correlator 128 may generate entries 312, 314, and 316. At step 410, the computing system may correlate, based on the log entries corresponding to the packets received by the network device and the log entries corresponding to the packets transmitted by the network device, the packets transmitted by the network device with the packets received by the network device. For example, packet correlator 128 may correlate, based on entries 306, 308, 310, 312, 314, and 316, P1' with P1, P2' with P2, and P3' with P3.

In some embodiments, the packets received by the network device may be associated with one or more flows (e.g., distinct end-to-end communication sessions); however, the network device may alter the packets in a way that obscures their association with the flow(s) from the computing system. For example, P1, P2, and P3 may be associated with a common flow; however, network device(s) 122 may alter P1, P2, and P3 (e.g., by generating P1', P2', and P3') in a way that obscures their association with the common flow from packet correlator 128. Correlating the packets transmitted by the network device with the packets received by the network device may enable the computing system to determine that the packets transmitted by the network device are associated with the flow(s). For example, correlating P1' with P1, P2' with P2, and P3' with P3 may enable packet correlator 128 to determine that P1', P2', and P3' are associated with the common flow.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium such as a hard disk, optical disk, removable storage media, solid-state memory, RAM, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

What is claimed is:

1. A packet-filtering device comprising:
one or more processors; and
memory storing instructions that, when executed by the one or more processors, cause the packet-filtering device to:
determine a first plurality of log entries corresponding to a first plurality of packets received by a network device from a first host located in a first network;
determine a second plurality of log entries corresponding to a second plurality of packets transmitted by the network device to a second host located in a second network;
determine whether one of the first host or the second host are associated with potentially malicious activity;
detect, based on the first plurality of log entries and the second plurality of log entries, a correlation between one or more packets of the first plurality of packets and one or more packets of the second plurality of packets by:
comparing the first plurality of log entries with the second plurality of log entries based on one or more of:
an ingress identifier,
an egress identifier,
network-layer information,
transport-layer information, or
application-layer information; and
determining, based on the comparing, the correlation between the one or more packets of the first plurality of packets and the one or more packets of the second plurality of packets;
determine, based on detecting the correlation between the one or more packets of the first plurality of packets and the one or more packets of the second plurality of packets and based on a determination that one of the first host and the second host are associated with the potentially malicious activity, that the other host, of the first host or the second host, is also associated with the potentially malicious activity;
generate, in response to the determining that the other host is also associated with the potentially malicious activity, one or more rules configured to identify packets associated with the other host; and
provision one or more devices with the one or more rules configured to identify packets associated with the other host.

2. The packet-filtering device of claim 1, wherein the instructions, when executed by the one or more processors, cause the packet-filtering device to determine the correlation based on a determination that both the first plurality of packets and the second plurality of packets correspond to an end-to-end flow.

3. The packet-filtering device of claim 1, wherein the instructions, when executed by the one or more processors, cause the packet-filtering device to determine whether one of the first host or the second host are associated with the potentially malicious activity based on one or both of:
a determination that an identity of the first host has been obscured, or
a determination that an identity of the second host has been obscured.

4. The packet-filtering device of claim 1, wherein the instructions, when executed by the one or more processors, cause the packet-filtering device to determine whether one of the first host or the second host are associated with the potentially malicious activity by determining that the one or more packets of the first plurality of packets indicate a man-in-the-middle attack.

5. The packet-filtering device of claim 1, wherein the instructions, when executed by the one or more processors, cause the packet-filtering device to determine whether one of the first host or the second host are associated with the potentially malicious activity by determining that the one or more packets of the first plurality of packets indicate that the network device comprises a proxy.

6. The packet-filtering device of claim 1, wherein the instructions, when executed by the one or more processors, cause the packet-filtering device to determine whether one of the first host or the second host are associated with the potentially malicious activity by determining that all or portions of the one or more packets of the first plurality of packets are spoofed.

7. The packet-filtering device of claim 1, wherein the one or more rules are configured to cause the one or more devices to drop the packets associated with the other host.

8. The packet-filtering device of claim 1, wherein the one or more rules are configured to cause the one or more devices to log information associated with the packets associated with the other host.

9. The packet-filtering device of claim 1, wherein the packet-filtering device is in the first network.

10. The packet-filtering device of claim 1, wherein the instructions, when executed by the one or more processors, cause the packet-filtering device to detect the correlation in response to the determination that one of the first host or the second host are associated with potentially malicious activity.

11. A method comprising
determining, by a packet-filtering device, a first plurality of log entries corresponding to a first plurality of packets received by a network device from a first host located in a first network;
determining, by the packet-filtering device, a second plurality of log entries corresponding to a second plurality of packets transmitted by the network device to a second host located in a second network;
determining whether one of the first host or the second host are associated with potentially malicious activity;
detecting, by the packet-filtering device and based on the first plurality of log entries and the second plurality of log entries, a correlation between one or more packets of the first plurality of packets and one or more packets of the second plurality of packets by:
comparing the first plurality of log entries with the second plurality of log entries based on one or more of:
an ingress identifier,
an egress identifier,
network-layer information,
transport-layer information, or
application-layer information; and
determining, based on the comparing, the correlation between the one or more packets of the first plurality of packets and the one or more packets of the second plurality of packets;
determining, based on detecting the correlation between the one or more packets of the first plurality of packets and the one or more packets of the second plurality packets and based on a determination that one or the first host and the second host are associated with the potentially malicious activity, that the other host, of the first host or the second host, is also associated with the potentially malicious activity;
generating, by the packet-filtering device and in response to the determining that the other host is also associated with the potentially malicious activity, one or more rules configured to identify packets associated with the other host; and
provisioning one or more devices with the one or more rules configured to identify packets associated with the other host.

12. The method of claim 11, wherein the determining the correlation is based on a determination that both the first plurality of packets and the second plurality of packets correspond to an end-to-end flow.

13. The method of claim 11, wherein the determining whether one of the first host or the second host are associated with the potentially malicious activity is based on one or both of:
a determination that an identity of the first host has been obscured, or
a determination that an identity of the second host has been obscured.

14. The method of claim 11, wherein the determining whether one of the first host or the second host are associated with the potentially malicious activity comprises determining that the one or more packets of the first plurality of packets indicate a man-in-the-middle attack.

15. The method of claim 11, wherein the determining whether one of the first host or the second host are associated with the potentially malicious activity comprises determining that the one or more packets of the first plurality of packets indicate that the network device comprises a proxy.

16. The method of claim 11, wherein the determining whether one of the first host or the second host are associated with the potentially malicious activity comprises determining that all or portions of the one or more packets of the first plurality of packets are spoofed.

17. The method of claim 11, wherein the one or more rules are configured to cause the one or more devices to drop the packets associated with the other host.

18. The method of claim 11, wherein the one or more rules are configured to cause the one or more devices to log information associated with the packets associated with the other host.

19. The method of claim 11, wherein the packet-filtering device is in the first network.

20. The method of claim 11, wherein detecting the correlation is in response to the determination that one of the first host or the second host are associated with potentially malicious activity.

21. One or more non-transitory computer-readable media storing instructions that, when executed by one or more processors of a packet-filtering device, cause the packet-filtering device to:
determine a first plurality of log entries corresponding to a first plurality of packets received by a network device from a first host located in a first network;
determine a second plurality of log entries corresponding to a second plurality of packets transmitted by the network device to a second host located in a second network;
determine whether one of the first host or the second host are associated with potentially malicious activity;
detect, based on the first plurality of log entries and the second plurality of log entries, a correlation between one or more packets of the first plurality of packets and one or more packets of the second plurality of packets by:
comparing the first plurality of log entries with the second plurality of log entries based on one or more of:
an ingress identifier,
an egress identifier,
network-layer information,
transport-layer information, or
application-layer information; and
determining, based on the comparing, the correlation between the one or more packets of the first plurality of packets and the one or more packets of the second plurality of packets;
determine, based on detecting the correlation between the one or more packets of the first plurality of packets and the one or more packets of the second plurality of packets and based on a determination that one of the first host and the second host are associated with the potentially malicious activity, that the other host, of the first host or the second host is also associated with the potentially malicious activity;
generate, in response to determining that the other host is also associated with the potentially malicious activity, one or more rules configured to identify packets associated with the other host; and
provision one or more devices with the one or more rules configured to identify packets associated with the other host.

22. The one or more non-transitory computer-readable media of claim 21, wherein the instructions, when executed by the one or more processors, cause the packet-filtering device to determine the correlation based on a determination that both the first plurality of packets and the second plurality of packets correspond to an end-to-end flow.

23. The one or more non-transitory computer-readable media of claim 21, wherein the instructions, when executed by the one or more processors, cause the packet-filtering device to determine whether one of the first host or the second host are associated with the potentially malicious activity based on one or both of:
 a determination that an identity of the first host has been obscured, or
 a determination that an identity of the second host has been obscured.

24. The one or more non-transitory computer-readable media of claim 21, wherein the instructions, when executed by the one or more processors, cause the packet-filtering device to determine whether one of the first host or the second host are associated with the potentially malicious activity by determining that the one or more packets of the first plurality of packets indicate a man-in-the-middle attack.

25. The one or more non-transitory computer-readable media of claim 21, wherein the instructions, when executed by the one or more processors, cause the packet-filtering device to determine whether one of the first host or the second host are associated with the potentially malicious activity by determining that the one or more packets of the first plurality of packets indicate that the network device comprises a proxy.

26. The one or more non-transitory computer-readable media of claim 21, wherein the instructions, when executed by the one or more processors, cause the packet-filtering device to determine whether one of the first host or the second host are associated with the potentially malicious activity by determining that all or portions of the one or more packets of the first plurality of packets are spoofed.

27. The one or more non-transitory computer-readable media of claim 21, wherein the one or more rules are configured to cause the one or more devices to drop the packets associated with the other host.

28. The one or more non-transitory computer-readable media of claim 21, wherein the one or more rules are configured to cause the one or more devices to log information associated with the packets associated with the other host.

29. The one or more non-transitory computer-readable media of claim 21, wherein the packet-filtering device is in the first network.

30. The one or more non-transitory computer-readable media of claim 21, wherein the instructions, when executed by the one or more processors, cause the packet-filtering device to detect the correlation in response to the determination that one of the first host or the second host are associated with potentially malicious activity.

* * * * *

UNITED STATES PATENT AND TRADEMARK OFFICE
CERTIFICATE OF CORRECTION

PATENT NO. : 11,956,338 B2
APPLICATION NO. : 18/199490
DATED : April 9, 2024
INVENTOR(S) : Ahn et al.

It is certified that error appears in the above-identified patent and that said Letters Patent is hereby corrected as shown below:

On the Title Page

Page 4, Column 2, Other Publications, Line 20:
Delete "joinged" and insert --joined-- therefor Page 5, Column 1, Other Publications, Line 3:
Delete "Netowrks" and insert --Networks-- therefor Page 6, Column 1, Other Publications, Line 48:
Delete "Softward" and insert --Software-- therefor Page 7, Column 2, Other Publications, Line 36:
Delete ""Buidling" and insert --"Building-- therefor Page 8, Column 1, Other Publications, Line 39:
Delete "Compaint" and insert --Complaint-- therefor Page 8, Column 2, Other Publications, Line 64:
Delete "Newtork" and insert --Network-- therefor Page 9, Column 1, Other Publications, Line 67:
Delete "disvoery" and insert --discovery-- therefor Page 9, Column 2, Other Publications, Line 46:
Delete "Safter" and insert --Safer-- therefor Page 10, Column 1, Other Publications, Line 23:
Delete "Organizatioins" and insert --Organizations-- therefor Signed and Sealed this
Third Day of September, 2024

Katherine Kelly Vidal
*Director of the United States Patent and Trademark Office*

Page 11, Column 2, Other Publications, Line 15:
Delete "S,M." and insert --S.M.-- therefor In the Claims Column 17, Claim 11, Line 1:
After "comprising", insert --:--